(12) United States Patent
Matsubayashi

(10) Patent No.: US 11,494,067 B2
(45) Date of Patent: Nov. 8, 2022

(54) INFORMATION PROCESSING APPARATUS THAT CHANGES VIEWPOINT IN VIRTUAL VIEWPOINT IMAGE DURING PLAYBACK, INFORMATION PROCESSING METHOD AND STORAGE MEDIUM

(71) Applicant: CANON KABUSHIKI KAISHA, Tokyo (JP)

(72) Inventor: Kazuhiro Matsubayashi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/536,673

(22) Filed: Aug. 9, 2019

(65) Prior Publication Data

US 2020/0073541 A1 Mar. 5, 2020

(30) Foreign Application Priority Data

Aug. 28, 2018 (JP) .............................. JP2018-159231

(51) Int. Cl.
*G06F 3/04847* (2022.01)
*G06F 3/04845* (2022.01)
(Continued)

(52) U.S. Cl.
CPC ...... *G06F 3/04847* (2013.01); *G06F 3/04845* (2013.01); *G06F 3/14* (2013.01);
(Continued)

(58) Field of Classification Search
None
See application file for complete search history.

(56) References Cited

U.S. PATENT DOCUMENTS 6,014,145 A * 1/2000 Bardon ................... G06T 15/10
345/427
6,522,787 B1 * 2/2003 Kumar ................... G06T 15/10
348/E5.022
(Continued)

FOREIGN PATENT DOCUMENTS

CN 101911129 A 12/2010
CN 102215325 A 10/2011
(Continued)

OTHER PUBLICATIONS

Office Action issued in Chinese Appln. No. 201910802849.3 dated Aug. 31, 2021. English translation provided.
(Continued)

*Primary Examiner* — Mandrita Brahmachari
(74) *Attorney, Agent, or Firm* — Rossi, Kimms & McDowell LLP

(57) ABSTRACT

The information processing apparatus of the present invention is an information processing apparatus that outputs viewpoint information for generation of a virtual viewpoint image based on image data obtained by performing image capturing from directions different from one another by a plurality of image capturing apparatuses and comprises: an acquisition unit configured to acquire viewpoint information having a plurality of virtual viewpoint parameter sets respectively indicating positions and orientations of a virtual viewpoint at a plurality of points in time; a change unit configured to change a virtual viewpoint parameter set included in the viewpoint information based on a user operation during playback of a virtual viewpoint image in accordance with viewpoint information acquired by the acquisition unit; and an output unit configured to output viewpoint information having a virtual viewpoint parameter set changed by the change unit.

16 Claims, 17 Drawing Sheets

(51) Int. Cl.
  *H04N 5/262* (2006.01)
  *G06F 3/14* (2006.01)
  *H04N 13/167* (2018.01)
  *H04N 5/247* (2006.01)
  *H04N 13/117* (2018.01)
(52) U.S. Cl.
  CPC ........... *H04N 5/247* (2013.01); *H04N 5/2628* (2013.01); *H04N 13/117* (2018.05); *H04N 13/167* (2018.05)

(56) References Cited

U.S. PATENT DOCUMENTS

| | | | | |
|---|---|---|---|---|
| 6,699,127 | B1* | 3/2004 | Lobb | A63F 13/10 463/43 |
| 2001/0045983 | A1* | 11/2001 | Okazaki | H04N 5/23206 348/211.99 |
| 2006/0028489 | A1* | 2/2006 | Uyttendaele | G09G 5/14 345/646 |
| 2008/0002035 | A1* | 1/2008 | Yoshida | H04N 1/32128 348/222.1 |
| 2008/0094358 | A1* | 4/2008 | Sullivan | G06T 3/20 345/161 |
| 2010/0104160 | A1* | 4/2010 | Lavi | G06T 19/00 382/131 |
| 2011/0157155 | A1* | 6/2011 | Turner | H04N 13/261 345/419 |
| 2015/0035820 | A1* | 2/2015 | Le | G06T 7/579 345/419 |
| 2015/0287158 | A1* | 10/2015 | Cerny | G06T 15/10 345/553 |
| 2016/0205341 | A1* | 7/2016 | Hollander | H04N 7/015 375/240.08 |
| 2018/0146218 | A1 | 5/2018 | Shimura | |
| 2018/0197324 | A1 | 7/2018 | Hanamoto | |

FOREIGN PATENT DOCUMENTS

| | | |
|---|---|---|
| CN | 103080882 A | 5/2013 |
| CN | 106663338 A | 5/2017 |
| JP | 2011221686 A | 11/2011 |
| WO | 2016178340 A1 | 11/2016 |
| WO | 2017141511 A1 | 8/2017 |

OTHER PUBLICATIONS

Office Action issued in Korean Appln No. 10-2019-0102195 dated Feb. 10, 2022. English machine translation provided.
Office Action issued in Chinese Appln. No. 201910802849.3 dated Aug. 2, 2022. English translation provided.

* cited by examiner

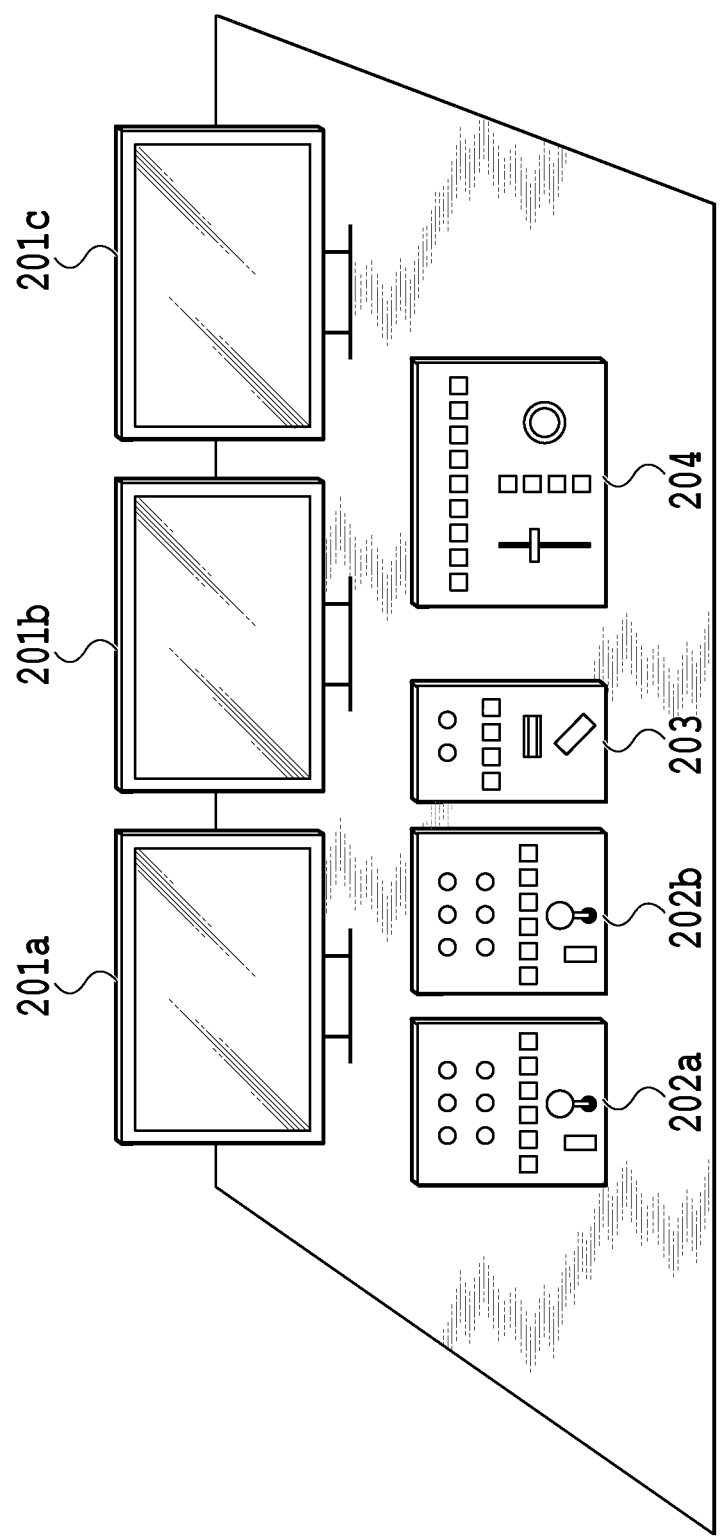

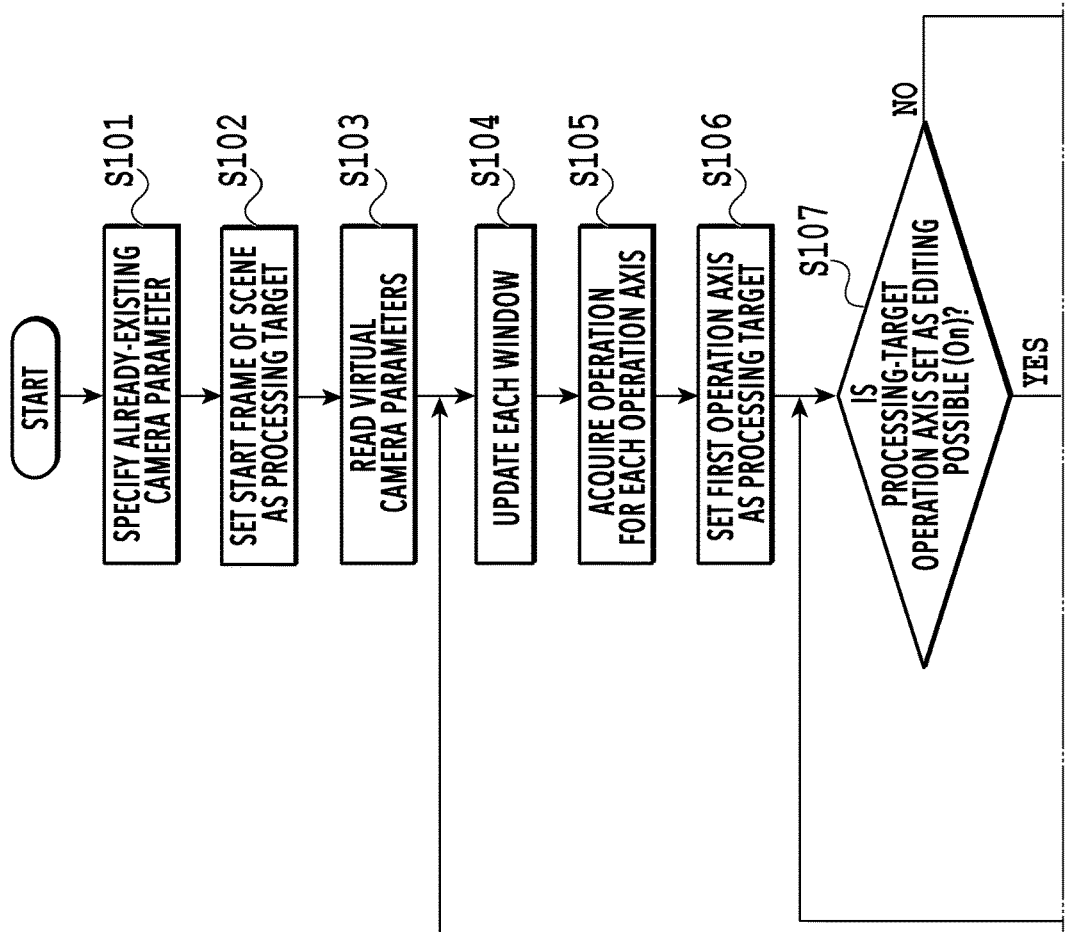

INFORMATION PROCESSING APPARATUS THAT CHANGES VIEWPOINT IN VIRTUAL VIEWPOINT IMAGE DURING PLAYBACK, INFORMATION PROCESSING METHOD AND STORAGE MEDIUM

BACKGROUND OF THE INVENTION

Field of the Invention

The present invention relates to a technique for performing an operation to specify an arbitrary virtual viewpoint in generation of a virtual viewpoint image.

Description of the Related Art

In recent years, a technique has been attracting attention, which generates a virtual viewpoint image from an arbitrary viewpoint, not only an image at a camera arrangement position, by installing a plurality of cameras at different positions to perform synchronous image capturing from a plurality of viewpoints and using multi-viewpoint images obtained by the image capturing. Generation and browsing of a virtual viewpoint image based on multi-viewpoint images are implemented by putting together images captured by a plurality of cameras in an image processing unit, such as a server, performing processing, such as rendering, based on the virtual viewpoint in the image processing unit, and further displaying a virtual viewpoint image on a user terminal.

In the virtual viewpoint image, the change of the viewpoint is performed by operating the position and orientation of a virtual camera arranged on a virtual three-dimensional space by a controller. Specifically, the position of the virtual camera is controlled by three axes of X, Y, and Z and the orientation of the virtual camera is controlled by three axes of pan, tilt, and roll. Further, the angle of view of the virtual camera is controlled by a zoom axis and the playback speed is controlled by a time axis.

Conventionally, the operation to change the viewpoint in a virtual viewpoint image is divided into the operation of each operation axis performed by each of a plurality of operators in order to operate each operation axis described above. Alternatively, one operator operates two controllers at the same time by using both hands, or the operation is performed by using a controller capable of operating each operation axis described above at the same time. Further, International Laid-Open No. 2016/178340 has disclosed a system that stores a history of an operation performed by another user in the past and presents (distributes) the operation history as a recommendation in order to acquire a video image from a desired viewpoint while lightening the burden of the operation.

However, in a case where the operation is divided to a plurality of operators, there is a concern that one operator performs an operation different from the operation intended by another operator. Due to this, there is a case where a desired camera parameter is not obtained. Further, in a case where a large number of virtual viewpoint images are created at the same time, on a condition that the number of operators is large, there is also a concern that the production cost is raised because labor costs are high.

On the other hand, in a case where one operator operates each operation axis described above at the same time, it is difficult to accurately adjust the values of all the operation axes. Further, in a case where it is desired to edit (adjust) the once-created camera parameter by specifying only the value of a part of the operation axes, it is necessary to perform the operation again for all the operation axes from the beginning, and therefore, it is difficult to obtain a desired virtual viewpoint image. This is the same in International Laid-Open No. 2016/178340, that is, there are restrictions on the degree of freedom of the virtual viewpoint operation.

SUMMARY OF THE INVENTION

In order to solve the above-described problems, the information processing apparatus of the present invention is an information processing apparatus that outputs viewpoint information for generation of a virtual viewpoint image based on image data obtained by performing image capturing from directions different from one another by a plurality of image capturing apparatuses and comprises:

an acquisition unit configured to acquire viewpoint information having a plurality of virtual viewpoint parameter sets respectively indicating positions and orientations of a virtual viewpoint at a plurality of points in time;

a change unit configured to change a virtual viewpoint parameter set included in the viewpoint information based on a user operation during playback of a virtual viewpoint image in accordance with viewpoint information acquired by the acquisition unit; and an output unit configured to output viewpoint information having a virtual viewpoint parameter set changed by the change unit.

Further features of the present invention will become apparent from the following description of exemplary embodiments with reference to the attached drawings.

BRIEF DESCRIPTION OF THE DRAWINGS

FIG. 2 is a schematic diagram of an input/output unit of the information processing apparatus;

FIG. 13 is a diagram showing the relationship of FIG. 13A and FIG. 13B;

FIG. 13A is a flowchart showing a procedure of processing in the information processing apparatus;

DESCRIPTION OF THE EMBODIMENTS

In the following, embodiments of the present invention are explained with reference to the drawings. The following embodiments are not intended to limit the present invention and all combinations of features explained in the present embodiments are not necessarily indispensable to the solution of the present invention. In addition, a variety of aspects in the scope not deviating from the gist of the present invention are also included in the present invention and it is also possible to appropriately combine parts of the following embodiments.

Figure 1A:
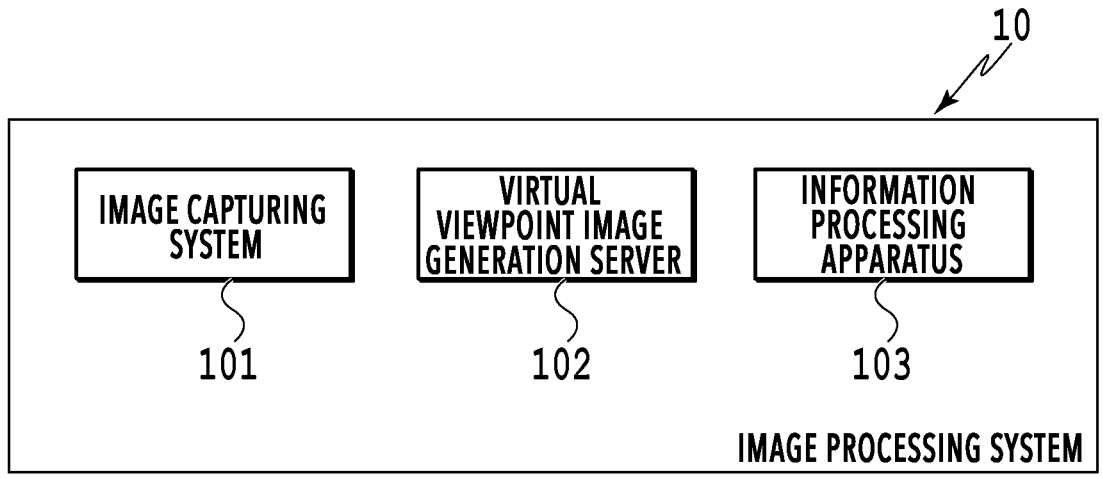
FIG. 1A is a diagram showing an entire configuration of an image processing system.
Figure 1B:
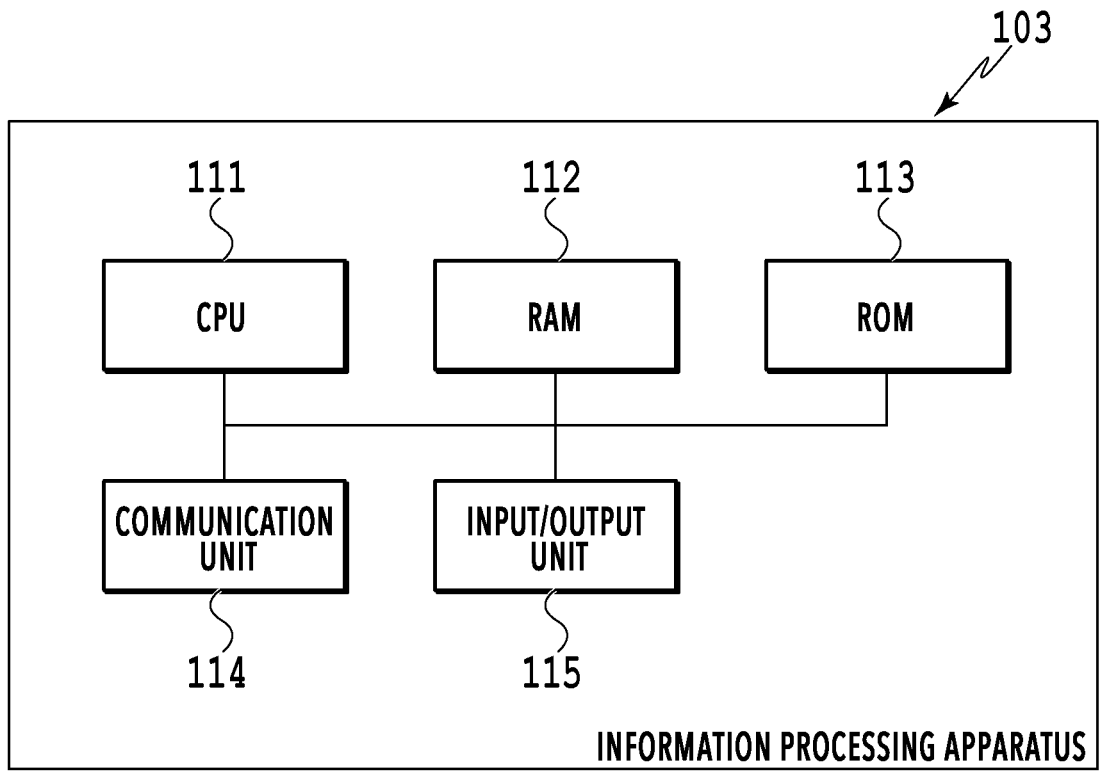
FIG. 1B is a diagram showing a hardware configuration of an information processing apparatus.

FIG. 1A and FIG. 1B are diagrams for explaining an image processing system 10. In more detail, FIG. 1A is a diagram showing an entire configuration of the image processing system 10 and FIG. 1B is a diagram showing a hardware configuration of an information processing apparatus 103 of the image processing system 10. In the following, each of FIG. 1A and FIG. 1B is explained.

As shown in FIG. 1A, the image processing system 10 includes an image capturing system 101, a virtual viewpoint image generation server 102, and the information processing apparatus 103. It is possible for the image processing system 10 to generate a virtual viewpoint image.

The image capturing system 101 arranges each of a plurality of cameras (image capturing apparatuses) at different positions and synchronously captures a plurality of images from a plurality of viewpoints. The image capturing system 101 transmits a plurality of images captured synchronously from a plurality of viewpoints to the virtual viewpoint image generation server 102.

The virtual viewpoint image generation server 102 acquires image data of a plurality of images captured synchronously from a plurality of viewpoints and generates a virtual viewpoint image viewed from a virtual cameral based on the plurality of images. Here, the virtual camera refers to a virtual camera capable of moving freely within an image capturing space. That is, it is possible for the virtual camera to capture an image from any viewpoint different from those of all the installed (arranged) cameras within the image capturing space. However, it may also be possible to impose certain restrictions on the position and orientation of the virtual camera. The viewpoint of the virtual camera is operated by camera parameters determined by the information processing apparatus 103, to be described later.

The virtual viewpoint image generation server 102 sequentially generates virtual viewpoint images from the plurality of received images. Consequently, for example, it is possible to generate a live virtual viewpoint image. The live virtual viewpoint image generated in the image processing system 10 is a virtual viewpoint image based on a captured image captured by the image capturing system 101 at a time that takes into consideration a processing delay in the image capturing system 101 and the virtual viewpoint image generation server 102 with respect to the current time.

Further, the virtual viewpoint image generation server 102 includes a predetermined database and has a function to record a plurality of received images. Because of this, from the plurality of recorded images, it is possible to generate a virtual viewpoint image in the past, that is, a replay virtual viewpoint image (that is, a virtual viewpoint image based on a captured image captured by the image capturing system 101 at an arbitrary time).

As a supplement, in the following explanation, unless specified in particular, it is assumed that the term "image" includes the concept of both a moving image and a still image. That is, it is possible for the image processing system 10 to perform processing for both a still image and a moving image.

The information processing apparatus 103 controls the virtual camera and determines camera parameters indicating the viewpoint of the virtual camera. The camera parameters of the virtual camera include a parameter for specifying at least one of position, orientation, zoom, and time of the virtual camera.

The position of the virtual camera specified by the camera parameters is indicated by, for example, three-dimensional coordinates or the like. Specifically, it is possible to indicate the virtual camera position by coordinates of the Cartesian coordinate system of the three axes of X-axis, Y-axis, and Z-axis. In this case, the three-dimensional position of the virtual camera specified by the camera parameters indicates coordinates and including three kinds of parameter corresponding to the three axes of X-axis, Y-axis, and Z-axis. Further, it may also be possible to take the origin at any position within the image capturing space.

The orientation of the virtual camera specified by the camera parameters is indicated by, for example, angles formed by the three axes of pan, tilt, and roll, or the like. In this case, the orientation of the virtual camera specified by the camera parameters includes the parameters of the three axes of pan, tilt, and roll. The zoom of the virtual camera specified by the camera parameter is indicated by the parameter of one axis of the focal length. Further, time is similarly indicated by the parameter of one axis.

As described above, the camera parameters of the virtual camera are a parameter set including eight parameters corresponding to the eight axes. Further, it is possible for the information processing apparatus 103 to control the virtual camera for these eight axes, which changes in a time series by changing viewpoint information having a plurality of camera parameters corresponding to each of a plurality of continuous points in time. The camera parameters may include a parameter regulating another element, or at least one of the above-described parameters of the eight axes may not be included.

The information processing apparatus 103 transmits the determined camera parameters of the virtual camera to the virtual viewpoint image generation server 102. Upon receipt of the camera parameters of the virtual camera, the virtual viewpoint image generation server 102 generates a virtual viewpoint image based on the received camera parameters and further transmits the generated virtual viewpoint image to the information processing apparatus 103. Then, the information processing apparatus 103 displays the received virtual viewpoint image on a camera view 301. It may also be possible to generate a live virtual viewpoint image and a replay virtual viewpoint image by the one information processing apparatus 103 as in the present embodiment, or it may also be possible to generate a live virtual viewpoint image and a replay virtual viewpoint image, respectively, by different information processing apparatuses by using two information processing apparatuses. Further, in FIG. 1A described above, the virtual viewpoint image generation server 102 and the information processing apparatus 103 are configured as separate units, but a configuration may also be accepted in which the virtual viewpoint image generation server 102 is included in the information processing apparatus 103.

Next, by using FIG. 1B, the hardware configuration of the information processing apparatus 103 is explained. The information processing apparatus 103 includes a CPU 111, a RAM 112, a ROM 113, a communication unit 114, and an input/output unit 115 as the hardware configuration thereof.

The CPU (Central Processing Unit) 111 controls the operation of the information processing apparatus 103 by using data stored in the RAM 112 and computer programs stored in the ROM 113. The RAM (Random Access Memory) 112 temporarily stores computer programs read from the ROM 113, intermediate data, which is midway results of calculation, data supplied from the outside via the communication unit 114, and the like. The ROM (Read Only Memory) 113 stores computer programs and data that do not need to be changed. It is assumed that the ROM 113 also includes a nonvolatile memory for storing data that needs to be stored even though the power supply is shut off.

The communication unit 114 includes a communication unit, such as Ethernet and USB (Universal Serial Bus), and performs communication with the virtual viewpoint image generation server 102. The input/output unit 115 includes a plurality of controllers for controlling the virtual camera and a plurality of display units displaying the state of the virtual camera and the like.

FIG. 2 is a schematic diagram of the input/output unit 115 of the information processing apparatus 103. As shown in FIG. 2, the input/output unit 115 includes three display units (201a, 201b, 201c). The display unit 201a displays a camera view window. The camera view window is a window for displaying a virtual viewpoint image received form the virtual viewpoint image generation server 102. The display unit 201b displays a pilot window. The pilot window is a window for controlling the virtual camera. The display unit 201c displays a replay window. The replay window is a window for generating and editing a replay virtual viewpoint image.

In the following explanation, there is a case where the display units 201a, 201b, and 201c are described collectively as a display unit 201. Further, it may also be possible for the information processing apparatus 103 to include a touch panel, a mouse, a keyboard, and the like, not shown schematically, in order to perform an operation for each window described above.

Furthermore, as shown in FIG. 2, the input/output unit 115 includes four controllers 202a, 202b, 203, and 204. The input/output unit 115 receives instructions for performing control of the virtual camera in accordance with a controller operation by a user. That is, the input/output unit 115 receives instructions for changing (for controlling) the position, orientation, and the like of the virtual camera.

The 3-axis controller 202a and the 3-axis controller 202b are controllers controlling (operating) three axes. It is possible to assign arbitrary control to each axis of the 3-axis controller by setting. It is possible to assign, for example, control of the X-axis, the Y-axis, and the Z-axis for specifying the position of the virtual camera to each axis of the 3-axis controller 202a. Further, it is possible to assign, for example, control of pan, tilt, and roll for specifying the orientation of the virtual camera to each axis of the 3-axis controller 202b.

The zoom controller 203 is a controller that controls zoom of the virtual camera. The replay controller 204 is a controller that controls a function for generating a replay virtual viewpoint image. Further, to the replay controller 204, control of the time of the virtual camera is also assigned.

In FIG. 2, for the input/output unit 115, a configuration including the three display units is shown as an example thereof, but a configuration including one, two, or four ore more display units may also be accepted. Similarly, in FIG. 2, for the input/output unit 115, a configuration including the four controllers is shown as an example thereof, but a configuration including three or less or five or more controllers may also be accepted.

Figure 3:
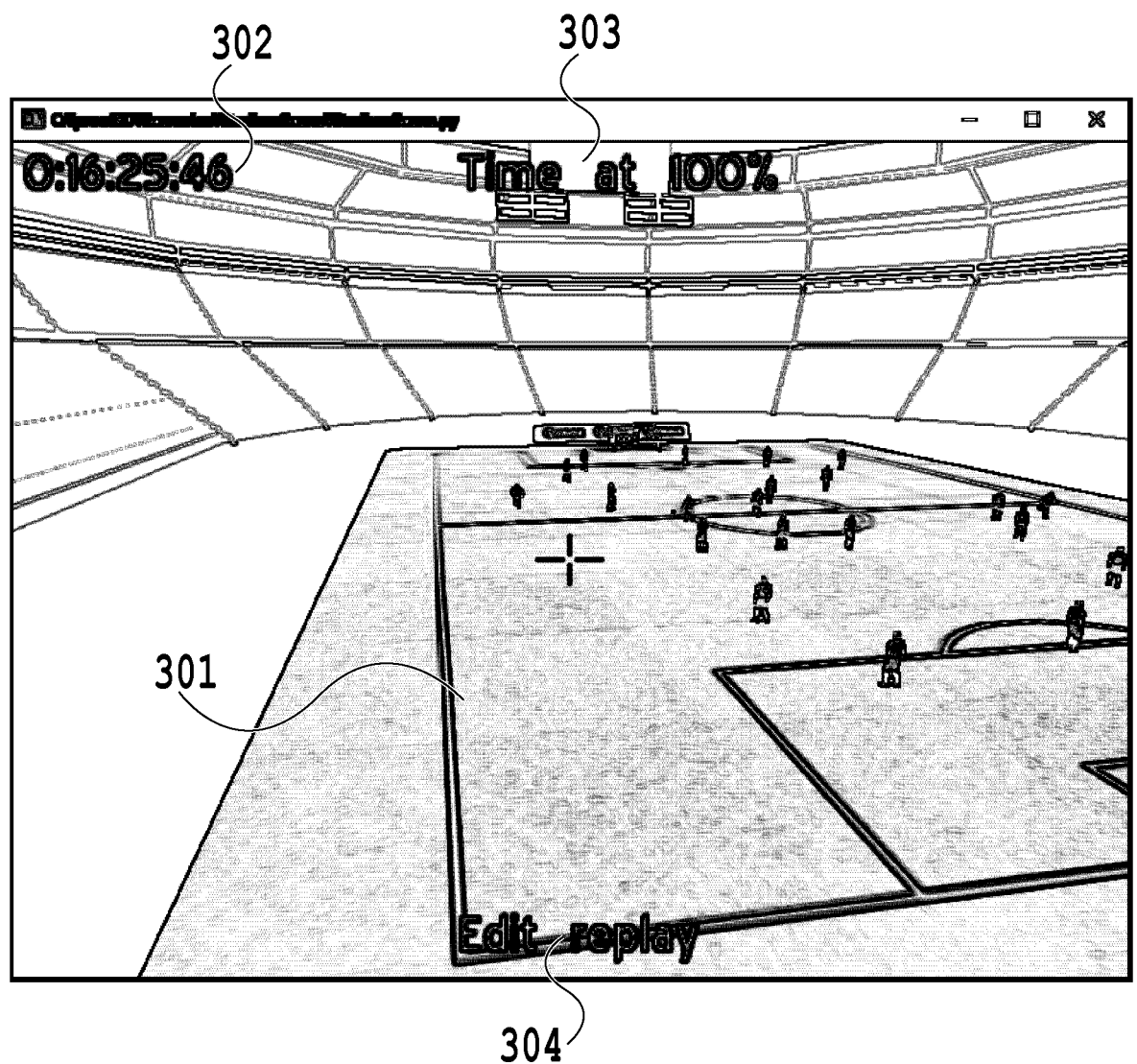
FIG. 3 is a diagram for explaining a camera view window.

FIG. 3 is a diagram for explaining the camera view window. As described above, the camera view window is displayed on the display unit 201a. The camera view 301 is a display area displaying a virtual viewpoint image received from the virtual viewpoint image generation server 102. This virtual viewpoint image is a virtual viewpoint image viewed from the virtual camera controlled by a user. Further, it is also possible for the information processing apparatus 103 to display a past virtual viewpoint image by controlling the time of the virtual camera.

A scene time 302 is an image capturing time of a captured image used for generation of a virtual viewpoint image to be displayed on the camera view 301. That is, the scene time 302 is the time of a virtual viewpoint image displayed on the camera view 301.

A scene playback speed 303 is a playback speed of a virtual viewpoint image displayed on the camera view 301. In a case where the scene playback speed 303 is 100%, a virtual viewpoint image is played back at the normal playback speed. Further, in a case where the scene playback speed 303 is smaller than 100%, a virtual viewpoint image is played back at a slow speed. For example, in a case where a one-second video image in the real time is played back in two seconds, the scene playback speed is 50%. Further, in a case where the scene playback speed 303 is larger than 100%, a virtual viewpoint image is played back by fast-forward.

In a case where the scene playback speed 303 is 0%, on the camera view 301, a virtual viewpoint image at a certain image capturing time is displayed in the state where the time stops and the scene time 302 does not change. However, even in a case where the scene playback speed 303 is 0%, it is possible to control the virtual camera. Specifically, for example, in soccer, it is possible to generate a virtual viewpoint image viewed from the viewpoint moving around a specific player at the instant the specific player kicks a ball.

A camera view state 304 is a state of a virtual viewpoint image displayed on the camera view 301. Specifically, for example, as the camera view state 304, there are five states as follows ("Review replay clip", "Live", "Recording", "Edit replay", "None").

"Review replay clip" is a state where a virtual viewpoint image of a replay clip is played back. "Live" is a state where a live virtual viewpoint image is played back. "Recording" is a state where a replay clip is recorded. "Edit replay" is a state where a recorded replay clip is edited. "None" is another state.

Figure 4:
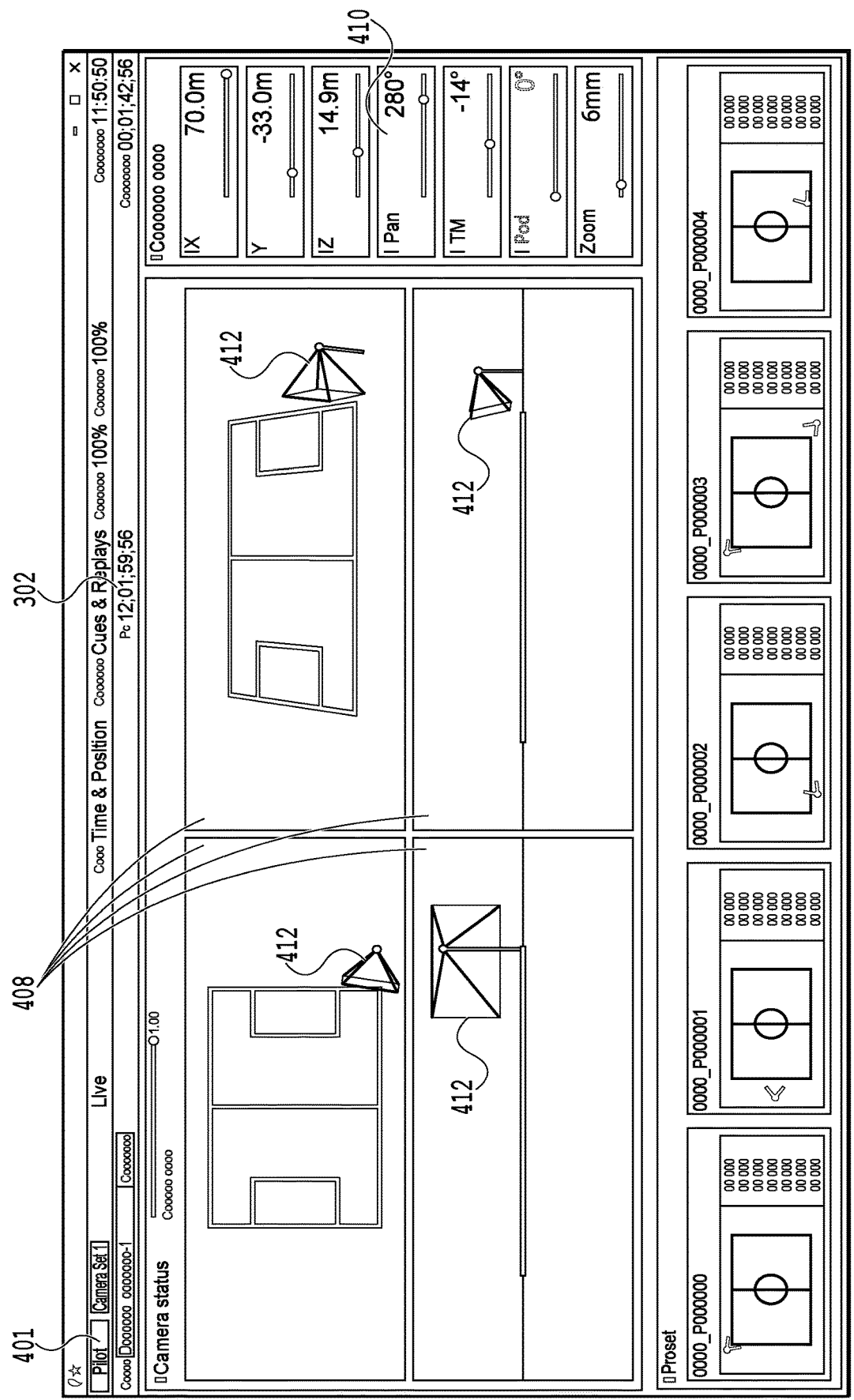
FIG. 4 is a diagram for explaining a pilot tab of a pilot window.

FIG. 4 is a diagram for explaining a pilot tab of a pilot window. The pilot window is displayed on the display unit 201b as described above. A switch button 401 is a button for switching contents to be displayed in the pilot window and includes a pilot tab and a camera control tab. In a case where the pilot tab is selected, on the display unit 201b, the state of the virtual camera is displayed mainly. In a case where the camera control tab is selected, on the display unit 201b, information relating to control of the virtual camera is displayed mainly.

A context view 408 is a display area displaying the position, orientation, and the like of the virtual camera controlled by a user from a bird's eye. In the example shown in FIG. 4, the pilot window includes the four context views 408. As shown in FIG. 4, in the top-left context view 408, an image of the field viewed from directly above is displayed and in the bottom-left context view 408, an image of the field viewed from the left side thereof along the long side direction in the top-left context view 408 is displayed. Further, in the bottom-right context view 408, an image of the field viewed from the lower side thereof along the short side direction in the top-left context view 408 is displayed and in the top-right context view 408, an image of the field viewed form obliquely above is displayed.

These images are generated by using, for example, a CG (Computer Graphics) image of a model of the stadium. Alternatively, it may also be possible to generate a virtual viewpoint image by separately preparing a virtual camera for the context view 408. It is possible for a user to easily grasp the position, orientation, and the like of the virtual camera in an image capturing space (for example, stadium) by checking the context view 408.

A camera parameter display 410 displays camera parameters of the virtual camera. Here, as the camera parameters of the virtual camera, coordinate values indicating the position of the virtual camera, pan, tilt, and roll indicating the orientation of the virtual camera, zoom, and the like are displayed. In a case of receiving an operation of a bar corresponding to each of various parameters on a GUI (Graphical User Interface), it is possible for the information processing apparatus 103 to change the value of the camera parameter. Of the camera parameters, the time of the virtual camera is displayed in the scene time 302. A virtual camera viewing angle display 412 is a CG indicating the position and orientation of the virtual camera within an image capturing space.

Figure 5:
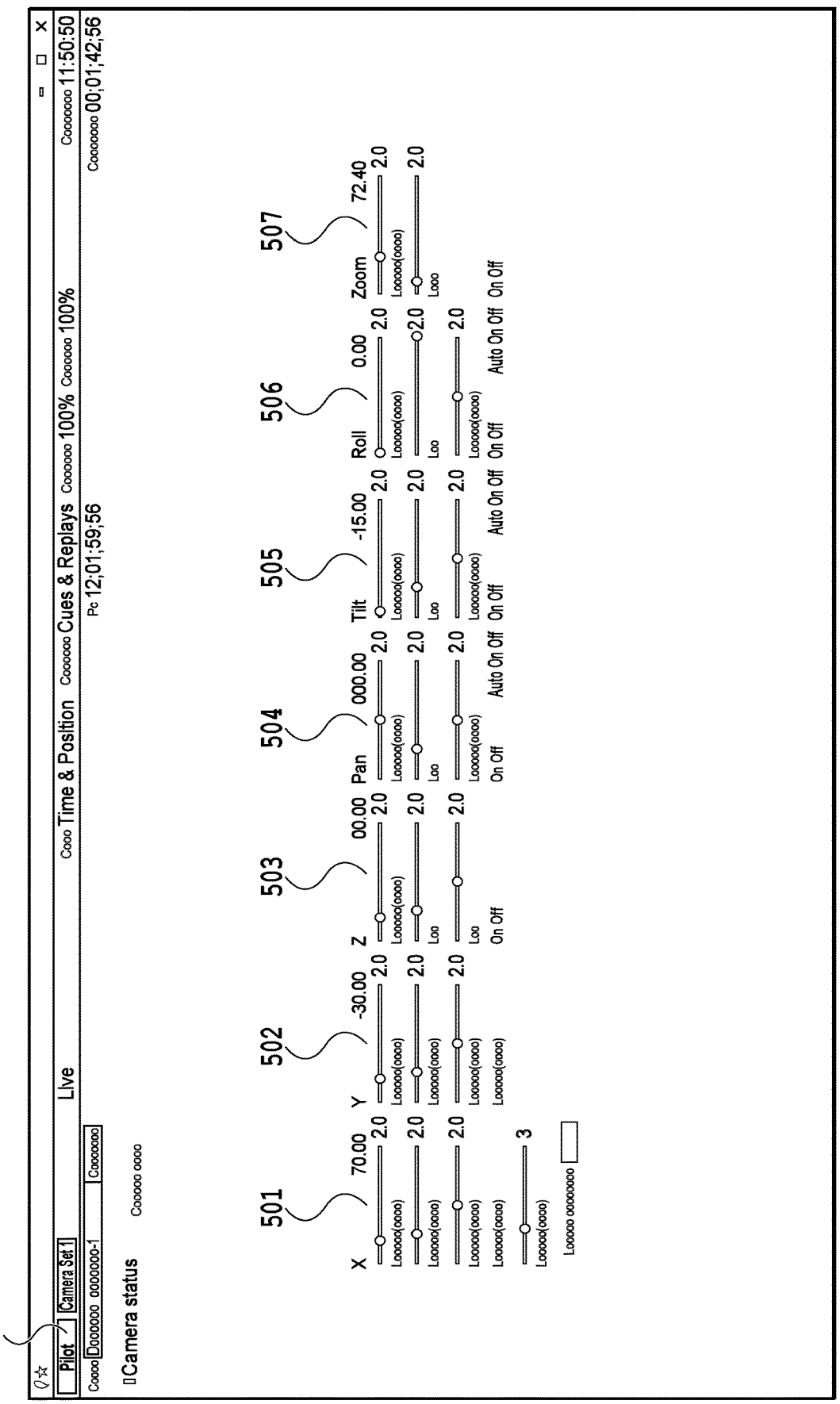
FIG. 5 is a diagram for explaining a camera control tab of the pilot window.

FIG. 5 is a diagram for explaining the camera control tab of the pilot window. An X-axis control setting 501 a setting unit configured to perform various settings relating to movement in the X-axis direction (horizontal direction) of the virtual camera. A Y-axis control setting 502 is a setting unit configured to perform various settings relating to movement in the Y-axis direction (forward and backward direction) of the virtual camera. A Z-axis control setting 503 is a setting unit configured to perform various settings relating to movement in the Z-axis direction (vertical direction) of the virtual camera.

A pan control setting 504 is a setting unit configured to perform various setting relating to rotation in the pan direction of the virtual camera. A tilt control setting 505 is a setting unit configured to perform various settings relating to rotation in the tilt direction of the virtual camera. A roll control setting 506 is a setting unit configured to perform various setting relating to rotation in the roll direction of the virtual camera. A zoom control setting 507 is a setting unit configured to perform various settings relating to zoom of the virtual camera.

Figure 6A:
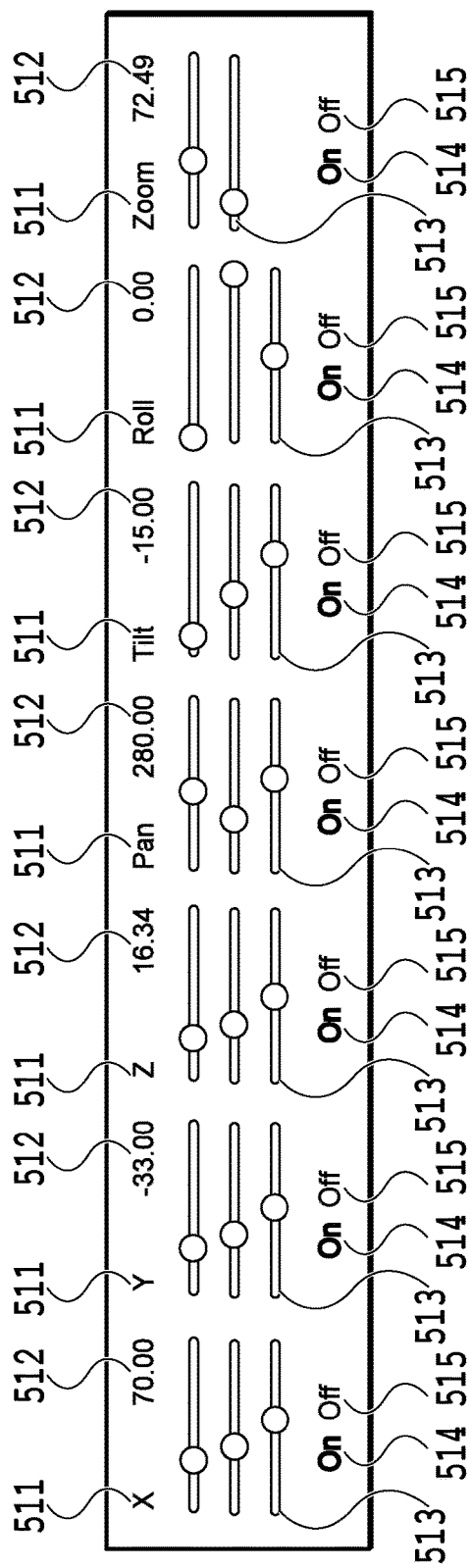
FIG. 6A is a diagram in which a part of the pilot window in a case where the camera control tab is selected is excerpted.
Figure 6B:
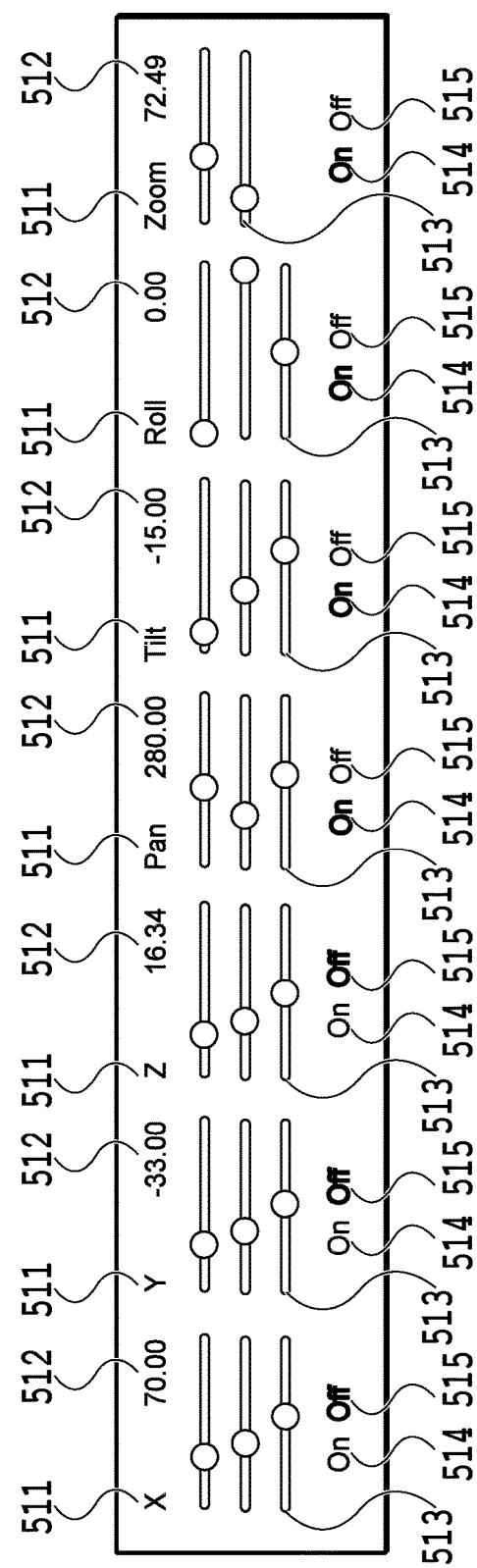
FIG. 6B is a diagram in which a part of the pilot window in a case where the camera control tab is selected is excerpted.

FIG. 6A and FIG. 6B are each a diagram in which a part of the pilot window in a case where the cameral control tab in FIG. 5 is selected is excerpted. In FIG. 6A and FIG. 6B, an operation axis name 511 indicates the item name of each operation axis. A camera parameter value 512 indicates the current value of each camera parameter determined in accordance with the operation for each operation axis. A slide bar 513 is a slide bar for performing various setting, such as a change speed (sensitivity relating to a change of a parameter) of a camera parameter for the operation amount of a controller.

An On switch 514 is a switch for making effective the editing operation of each operation axis (for making a parameter corresponding to the operation axis a change target) and an Off switch 515 is a switch for making ineffective the editing operation of each operation axis (for excluding a parameter corresponding to the operation axis from the change target). Specifically, in a case where the On switch 514 is clicked, a state (On state) where the editing operation is possible with the operation axis is brought about and the On switch 514 of the operation axis is highlighted and at the same time, the Off switch 515 of the operation axis is not highlighted. Further, in a case where the Off switch 515 is clicked, a state (Off state) where the editing operation is not possible with the operation axis is brought about and the Off switch 515 of the operation axis is highlighted and at the same time, the On switch 514 of the operation axis is not highlighted. FIG. 6A shows a case where all the operation axes are in the On state and FIG. 6B shows a case where the X-axis, the Y-axis, and the Z-axis for specifying the position of the virtual cameral are in the Off state and the other operation axes are in the On state. In a case where the user operation for the operation axis in the On state is performed, the parameter corresponding to the operation axis is changed with the set sensitivity and the change amount in accordance with the user operation.

As long as the function to switch between effective and ineffective is mounted for the editing operation of each operation axis, the aspect is not necessarily limited to the above-described aspect (that is, the On switch 514, Off switch 515). Consequently, it may also be possible for one switch, button, or the like to switch between effective and ineffective of the editing operation of each operation axis. Further, it may also be possible to display the On switch 514 and the Off switch 515 in another window (for example, the cameral parameter display 410 of the pilot window in a case where the pilot tab in FIG. 4 is selected, or the like).

Figure 7:
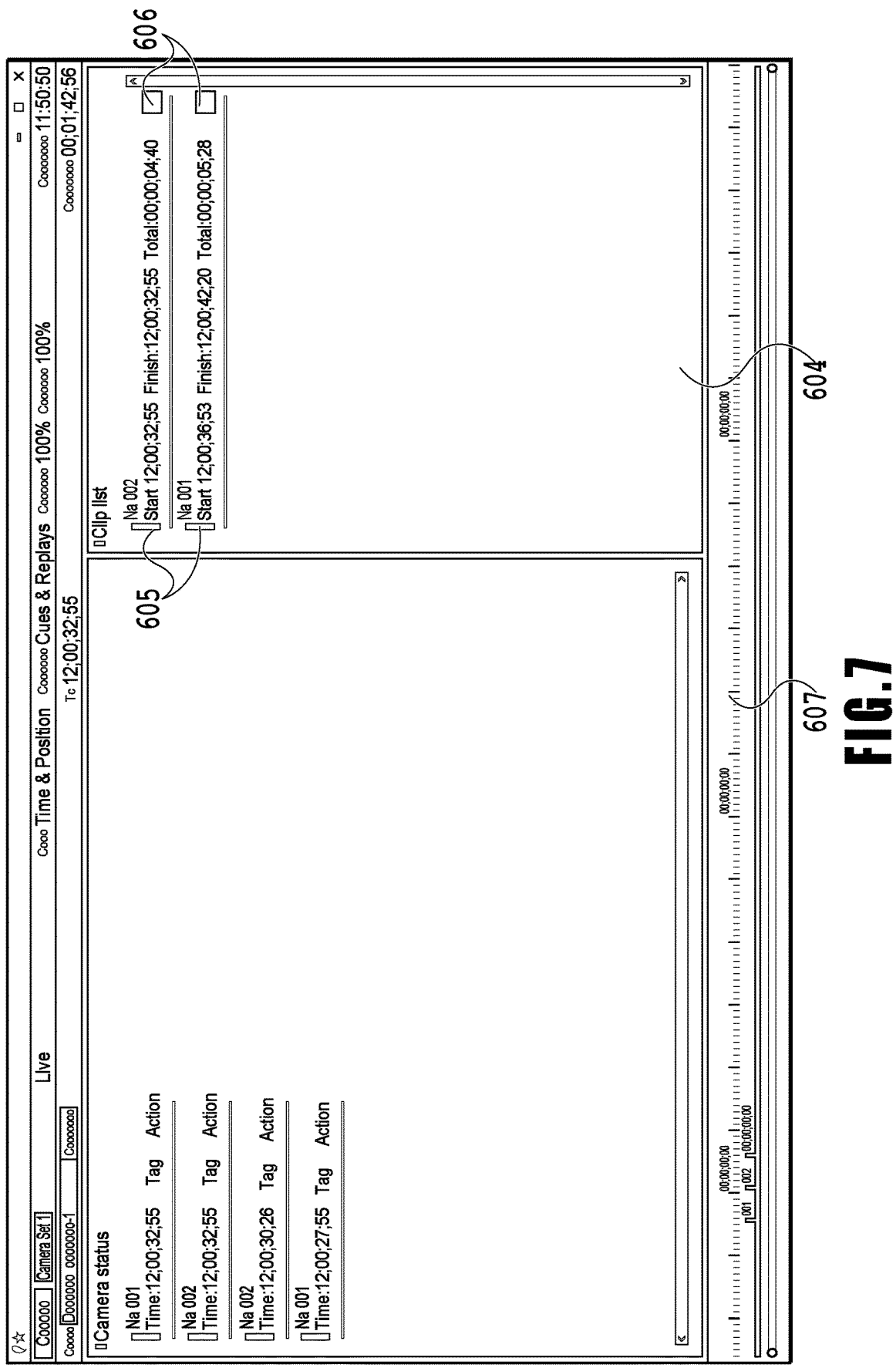
FIG. 7 is a diagram for explaining a replay window.

FIG. 7 is a diagram for explaining the replay window. The replay window displays information relating mainly to generation of the replay clip. A replay clip list 604 is a list for managing a replay clip 605 generated by a user. In the replay clip list 604 in FIG. 7, the replay clips 605 are displayed in order from the most recent replay clip 605.

The replay clip 605 records camera parameters of the virtual camera. That is, the information processing apparatus 103 records the replay clip 605 as camera parameters, not as images. Then, the replay image is obtained by generating the virtual viewpoint images of the recorded camera parameters in order.

In a case where a replay clip editing button 606 is pressed down in the replay window, editing of the replay clip is started. In the replay clip editing, a camera parameter once created is re-operated and modified in order to make the camera parameter a better camera parameter. Then, in this modification of the created camera parameter, of the operation axes of the virtual camera, only the value of the specified operation axis changes and the previous values are maintained (stored) for the other operation axes. Due to this, it is possible to reduce the number of operation-target operation axes in the one-time operation (modification), and therefore, it is possible to improve the degree of freedom of the virtual viewpoint operation and as a result of this, it is possible to lighten the burden of the operation and the number of operators.

On a timeline 607, in accordance with progress of a game, the camera parameters of the virtual camera are recorded for each frame. On the timeline 607, the parameters of the virtual camera are recorded as follows. In a case where the information processing apparatus 103 is used for generation of a live virtual viewpoint image, on the timeline 607, the camera parameters of the virtual camera at that time are recorded. In a case where the information processing apparatus 103 is used for generation of a relay virtual viewpoint image, on the timeline 607, the camera parameters of the virtual camera are not recorded.

In a case where one point on the timeline 607 is clicked, the time jumps to the clicked time and the values of the camera parameters of the frame corresponding to the time are set to the virtual camera. In a case where the camera parameters are not recorded in the corresponding frame, the camera parameters of the virtual camera at the time of the click are applied. That is, in this case, the position and orientation remain unchanged and only the time jumps.

Figure 8:
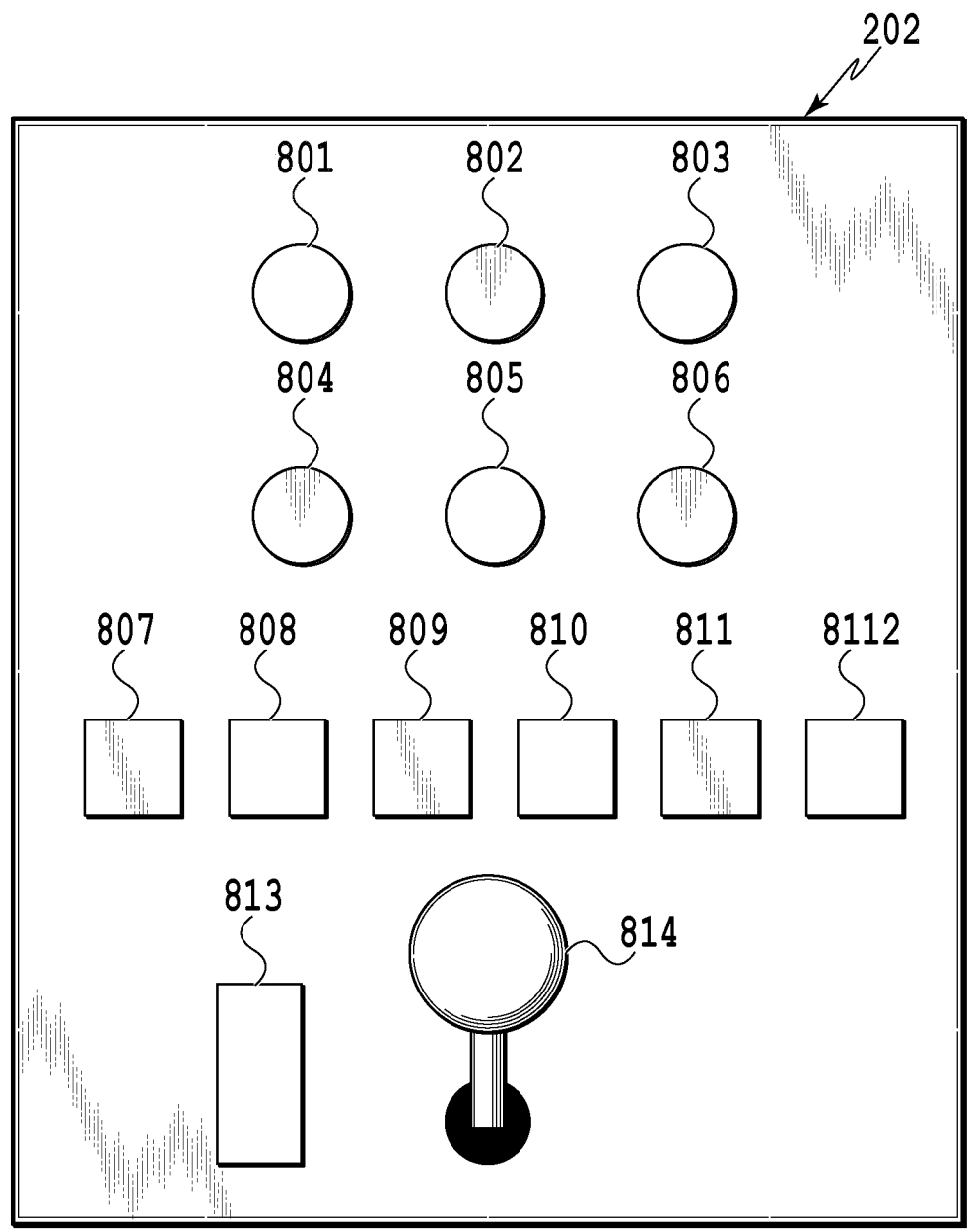
FIG. 8 is a diagram for explaining a 3-axis controller.

FIG. 8 is a diagram for explaining the 3-axis controller 202. The 3-axis controller 202 is capable of controlling three axes by the one 3-axis controller 202 and includes six knobs 801 to 806, six buttons 807 to 812, a seesaw switch 813, and a 3-axis joystick 814. In the present embodiment, by using the two 3-axis controllers 202, control of six axes is assigned. In the following, control of the three axes of X, Y, and Z is assigned to one of the two 3-axis controllers 202, that is, the 3-axis controller 202a, and control of the three axes of pan, tilt, and roll is assigned to the other 3-axis controller 202, that is, the 3-axis controller 202b.

Next, functions assigned to the knobs, the buttons, the seesaw switch, and the 3-axis joystick of the 3-axis controller 202a are explained. In the 3-axis controller 202a, to the button 807, On/Off of the X-axis is assigned, to the button 808, On/Off of the Y-axis is assigned, and further to the button 809, On/Off of the Z-axis is assigned. Furthermore, to the seesaw switch 813, the Z-axis is assigned and to the 3-axis joystick 814, the X-axis is assigned for the tilt to left and right and the Y-axis is assigned for the tilt forward and backward. The twist to left and right is not assigned in the 3-axis controller 202a.

Similarly, functions assigned to the knobs, the buttons, the seesaw switch, and the 3-axis joystick of the 3-axis controller 202b are explained. In the 3-axis controller 202b, to the button 807, On/Off of the pan is assigned, to the button 808, On/Off of the tilt is assigned, and further, to the button 809, On/Off of the roll is assigned. Furthermore, to the 3-axis joystick 814, the pan is assigned for the tilt to left and right, the tilt is assigned for the tilt forward and backward, and the roll is assigned for the twist to left and right. In the 3-axis controller 202b, a predetermined function is not assigned to the seesaw switch 813.

In addition, as a supplement, as for the joystick, it is also possible to use a joystick capable of controlling four or more operation axes. For example, it may also be possible to assign the X-axis for translation to left and right, the Y-axis for forward and backward translation, the Z-axis for pulling up/pressing down, the pan for the tilt to left and right, the tilt for the tilt forward and backward, and the roll for the twist to left and right.

Figure 9:
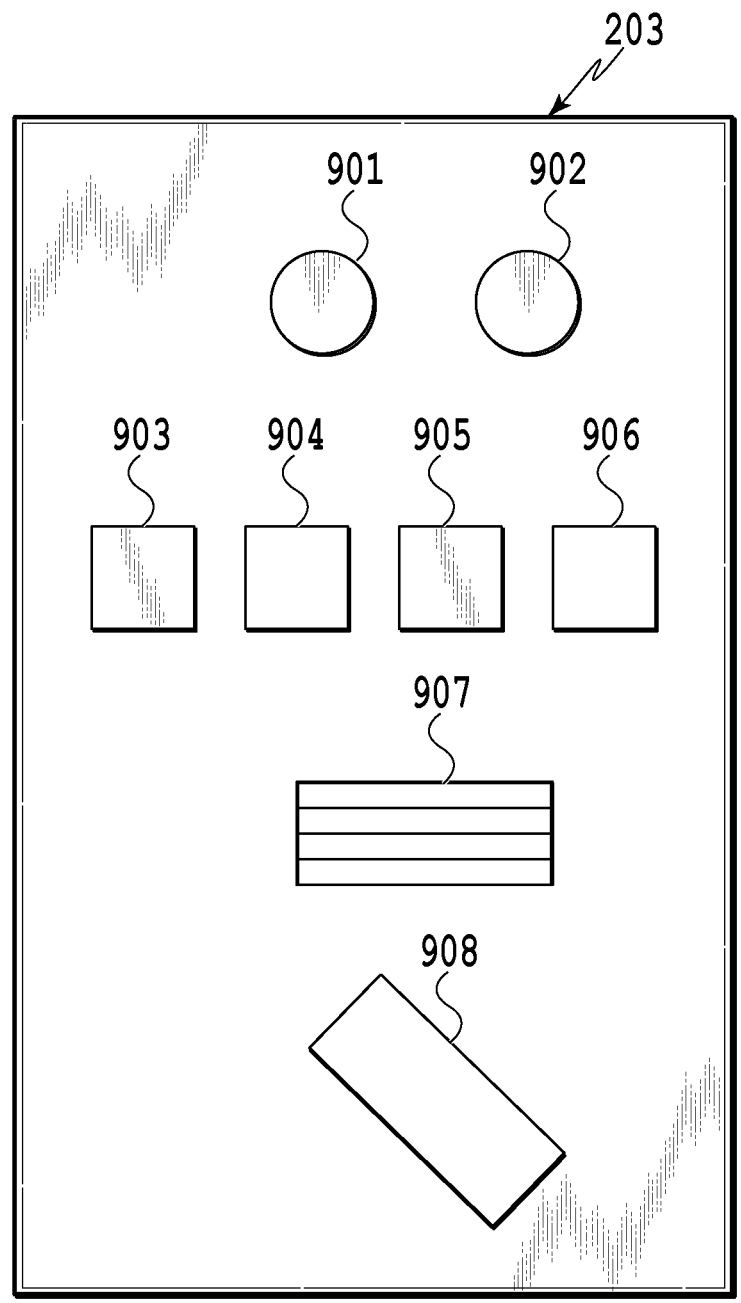
FIG. 9 is a diagram for explaining a zoom controller.

FIG. 9 is a diagram for explaining the zoom controller 203. The zoom controller 203 includes two knobs 901 and 902, four buttons 903 to 906, a dial 907, and a seesaw switch 908. In the zoom controller 203, to the button 903, On/Off of the zoom is assigned, to the dial 907, the focus is assigned, and to the seesaw switch 908, the zoom is assigned.

Figure 10:
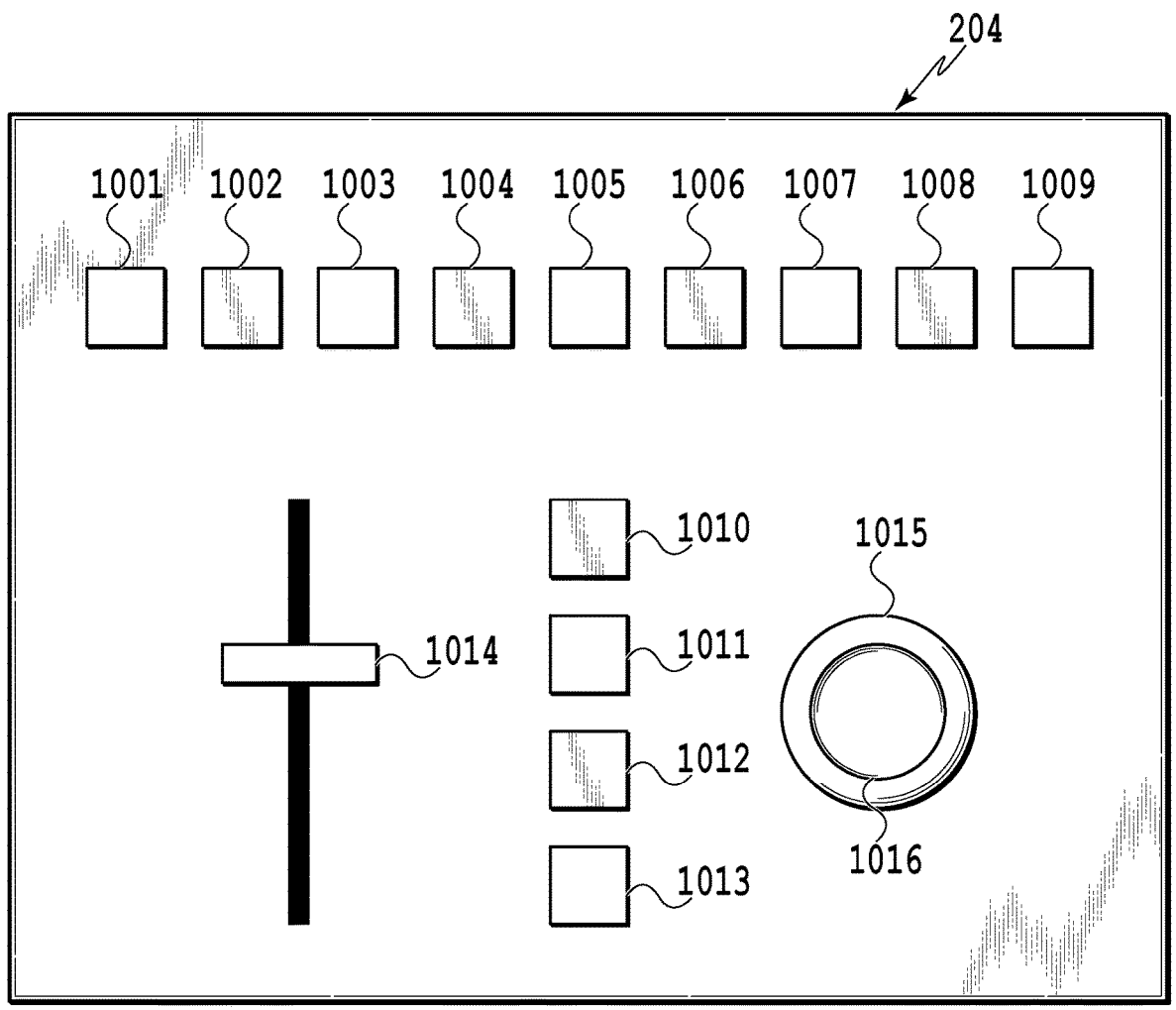
FIG. 10 is a diagram for explaining a replay controller.

FIG. 10 is a diagram for explaining the replay controller 204. The replay controller 204 includes 13 buttons 1001 to 1013, a slider 1014, a jog wheel 1015, and a finger wheel 1016. In the following, functions assigned in the replay controller 204 are explained.

To the button 1010, REC is assigned and in a case where this button 1010 is pressed down, creation of a replay clip is started and after this, parameters of the virtual camera operated by a user are recorded as a replay clip. To the button 1011, PLAY/PAUSE is assigned and the playback and pause of a scene are performed by this button 1011. During a pause, the time of the virtual camera is stopped. Further, to the button 1012, REVIEW is assigned and in a case where this button 1012 is pressed down, the playback of a replay clip is started.

The slider 1014 is a slider for setting a scene playback speed. In a case where a scene playback speed is set by this slider 1014, the time of the virtual camera is changed in accordance with the set scene playback speed. The jog wheel 1015 is for setting a time. By this jog wheel 1015, rewind, fast-forward, and the like of time are performed. The finger wheel 1016 is for setting a time in units of frames. By this finger wheel 1016, rewind, fast-forward, and the like of time are performed in units of frames. That is, with the finger wheel 1016, it is possible to control time more meticulously than the jog wheel 1015.

In the controllers 202, 203, and 204, knobs, buttons, switches, and the like other than those explained above are not related to the present embodiment, and therefore, explanation thereof is omitted. Further, it is also possible to assign functions, for example, such as depth of field adjustment and focus adjustment, other than the functions described above. In the following, each embodiment is explained with reference to FIG. 11A to FIG. 16.

First Embodiment

FIG. 11A to FIG. 11F are diagrams for explaining the operation axes of the virtual camera. Of the operation axes, an X-axis 703, a Y-axis 704, and a Z-axis 705 correspond to move operation directions of the virtual camera. The X-axis 703, the Y-axis 704, and the Z-axis 705 are perpendicular to one another and the Z-axis 705 is the direction perpendicular to a ground surface 702 at all times irrespective of the orientation of a virtual camera 701. Because of this, the X-axis 703 and the Y-axis 704 are in the direction parallel to the ground surface 702 at all times irrespective of the orientation of the camera. The X-axis 703 and the Y-axis 704 change the direction in accordance with the orientation of the virtual camera 701. The direction in which the optical axis of the virtual camera 701 is projected onto a plane parallel to the ground surface 702 is the Y-axis 704 and the direction perpendicular to the optical axis of the virtual camera 701 is the X-axis 703. Of the operation axes, a Pan axis 706 corresponds to the rotation operation direction with the Z-axis 705 as a rotation axis, a Tilt axis 707 corresponds to that with the X-axis 703 as a rotation axis, and a Roll axis 708 corresponds to that with the Y-axis 704 as a rotation axis, respectively.

Figure 11A:
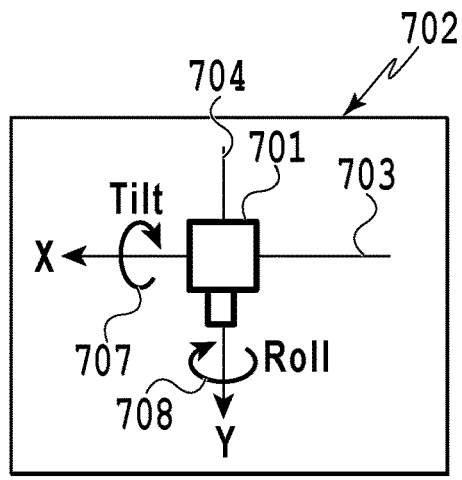
FIG. 11A to FIG. 11F are each a diagram for explaining an operation axis of a virtual camera.
Figure 11B:
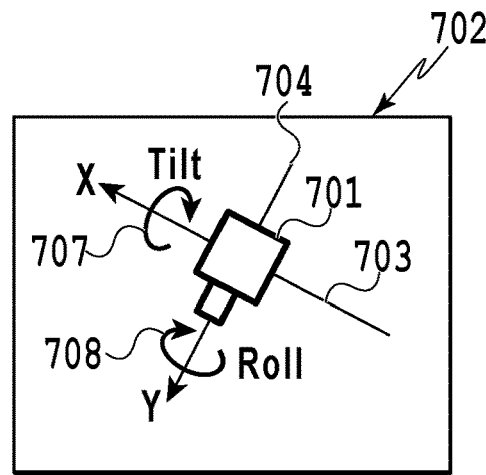
Figure 11C:
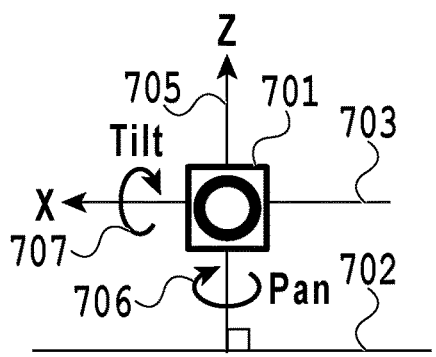
Figure 11D:
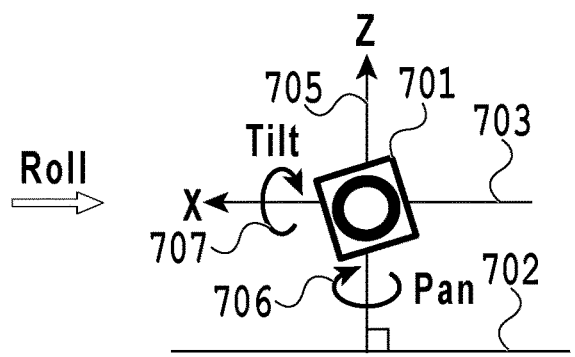
Figure 11E:
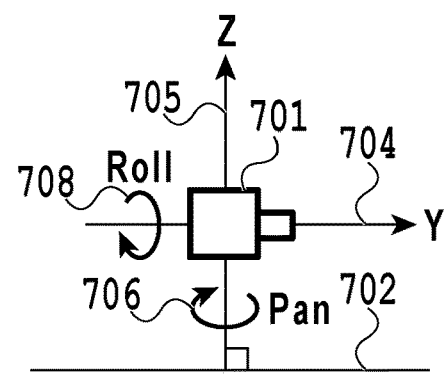
Figure 11F:
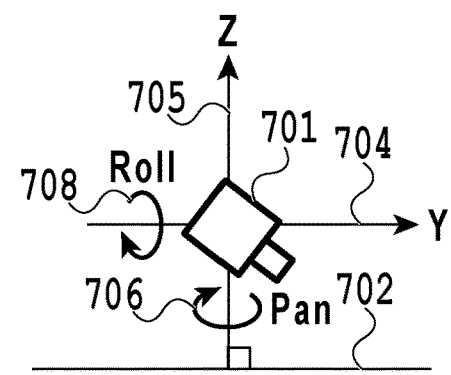

FIG. 11A and FIG. 11B are diagrams of the virtual camera 701 viewed from the Z-axis direction. In a case where the virtual camera is panned (that is, rotated around the Z-axis as a rotation axis) from the state in FIG. 11A, the state in FIG. 11B is brought about. FIG. 11C and FIG. 11D are diagrams of the virtual camera 701 viewed from the Y-axis direction. In a case where the virtual camera is rolled (that is, rotated around the Y-axis as a rotation axis) from the state in FIG. 11C, the state in FIG. 1D is brought about. FIG. 11E and FIG. 11F are diagrams of the virtual camera 701 viewed from the X-axis direction. In a case where the virtual camera is tilted (that is, rotated around the X-axis as a rotation axis) from the state in FIG. 11E, the state in FIG. 11F is brought about.

How each camera parameter changes in accordance with the operation for each operation axis depends on the setting of the slide bar 513 in the pilot window in a case where the camera control tab shown in FIG. 6A and FIG. 6B is selected. Further, the operation axis and the camera parameter item do not necessarily correspond to each other in a one-to-one manner. For example, the X-axis of the operation axis is in the horizontal direction for the virtual camera and the Y-axis is in the forward and backward direction for the virtual camera, but it may also be possible to take the X-axis of the camera parameter in the long side direction of the ground and the Y-axis in the short side direction of the ground. In this case, by interactively combining the current value of the X-axis and the current value of the Y-axis of the camera parameters with the value of the X-axis and the value of the Y-axis of the operation axes, the value of the X-axis and the value of the Y-axis of the camera parameters after editing are determined. Specifically, for example, in a case where the X-axis is set to Off (editing not possible) and Y-axis is set to On (editing possible), on a condition that the virtual camera is moved in the forward and backward direction, each of the value of the X-axis and the value of the Y-axis of the camera parameters changes for the movement in the direction oblique to the ground.

Figure 12:
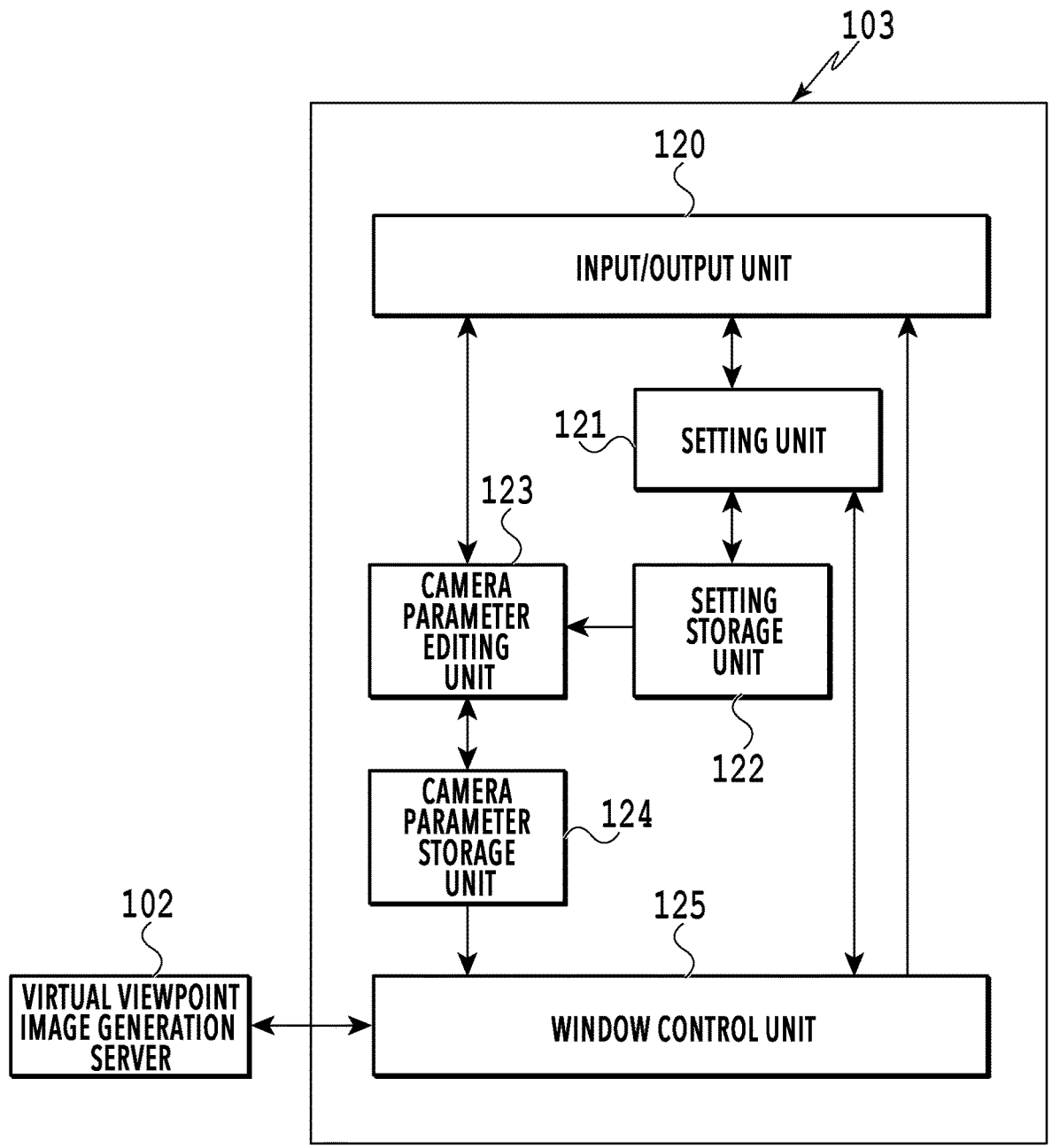
FIG. 12 is a diagram showing a function block of the information processing apparatus.

FIG. 12 is a diagram showing the function block of the information processing apparatus 103. An input/output unit 120 is a function implemented by the input/output unit 115 including the above-described controllers 202a to 204 and the display units 201a to 201c and displays the states and the like of a plurality of controllers for controlling the virtual camera and the virtual camera.

A setting unit 121 sets various camera parameters in accordance with the operation of the controller. For example, various settings in the pilot window shown in FIG. 6A and FIG. 6B in a case where the camera control tab is selected and the settings by the various buttons of the 3-axis controller in FIG. 8 correspond to the various camera parameters. The values set in the setting unit 121 are stored in a setting storage unit 122.

A camera parameter editing unit 123 edits camera parameters in accordance with the operation from a user via the input/output unit 120. Specifically, the camera parameter editing unit 123 edits camera parameters by setting the position and field of view of the virtual camera in accordance with the operation in the input/output unit 120 in each frame from the point in time of start of the scene of the moving image until the point in time of end of the scene. A camera parameter storage unit 124 stores the camera parameters edited by the camera parameter editing unit 123 in association with the elapsed time of the three-dimensional object data.

A window control unit 125 performs display control of the various windows, such as the camera view window, the pilot window, and the replay window. The window control unit 125 reads the camera parameters in each frame from the camera parameter storage unit 124 in the camera view window and passes the camera parameters to the virtual viewpoint image generation server 102. Further, the window control unit 125 displays a virtual viewpoint image generated by the virtual viewpoint image generation server 102 within the camera view window of the display unit 201a of the input/output unit 115. Furthermore, the window control unit 125 reads the camera parameters in each frame from the camera parameter storage unit 124 in the pilot window and draws the virtual camera viewing angle display 412 in accordance with the position and orientation of the camera parameters.

Figure 13B:
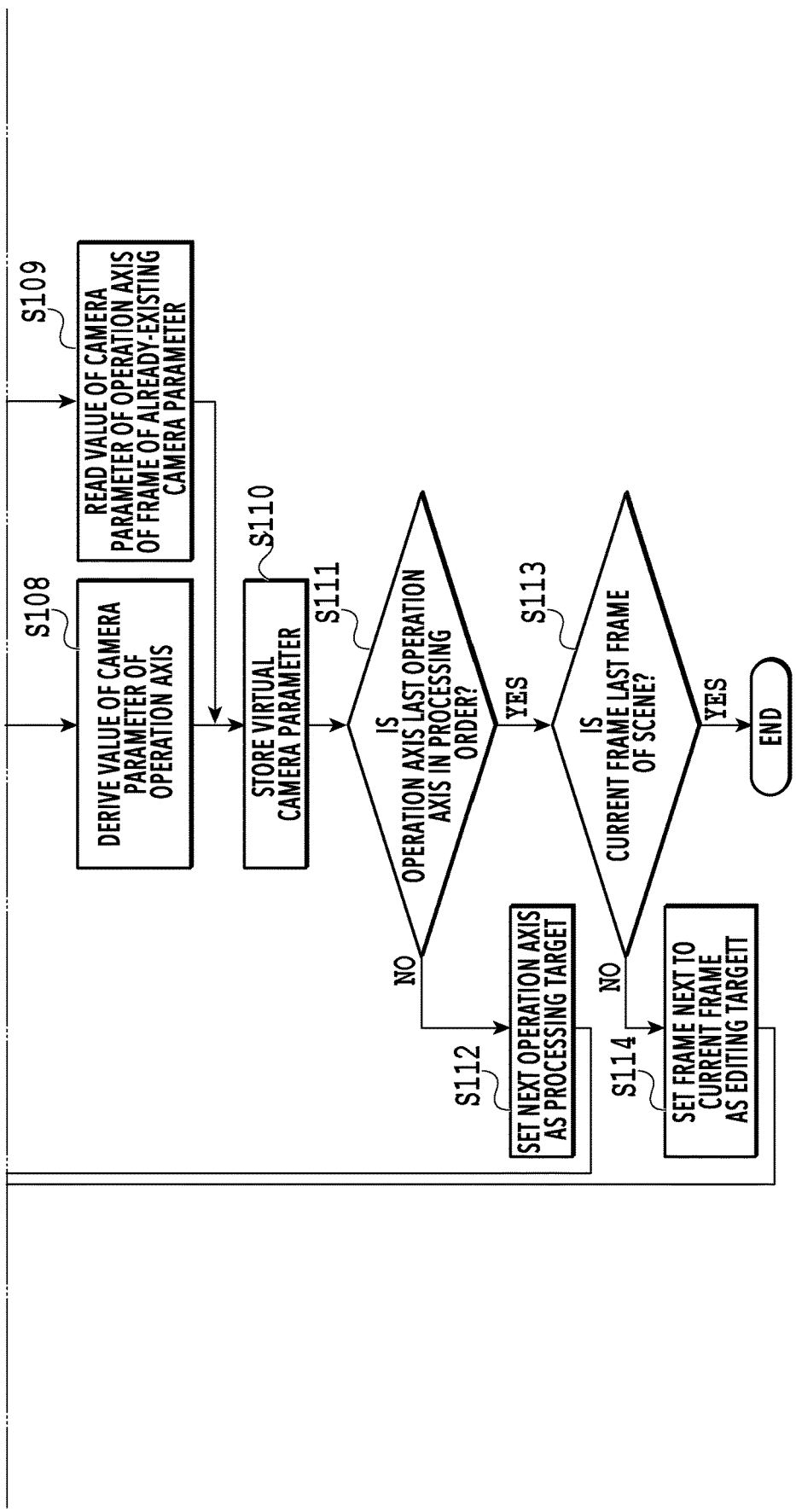
FIG. 13B is a flowchart showing a procedure of processing in the information processing apparatus.

FIG. 13A and FIG. 13B are flowcharts showing a procedure of processing in the information processing apparatus 103. In the following, it is assumed that symbol "S" in explanation of the flowchart indicates a step. That is, here, each of processing step S101 to step S114 in the flowchart is abbreviated to S101 to S114.

At S101, the camera parameter editing unit 123 reads one camera parameter specified by an operator from the camera parameters already stored in the camera parameter storage unit 124. Specifically, the camera parameter editing unit 123 displays the replay clip list 604 displayed in the replay window shown in FIG. 7 and an operator selects (specifies) the one replay clip 605 from the list.

At S102, the camera parameter editing unit 123 sets the start frame of the scene as a processing target. At S103, the camera parameter editing unit 123 reads the virtual camera parameters in the start frame of the scene. At S104, the window control unit 125 reads the virtual camera parameters from the camera parameter storage unit 124 and plays back the virtual viewpoint image in accordance with the camera parameters by updating the camera view window and the pilot window. In the updating of the camera view window, the window control unit 125 passes the virtual camera parameters to the virtual viewpoint image generation server 102 and displays the virtual viewpoint image generated in the virtual viewpoint image generation server 102 in the camera view window (camera view). Further, in the updating of the pilot window, the window control unit 125 draws the virtual camera viewing angle display 412 in accordance with the position and orientation of the camera parameters. The processing at S104 to S114 is the processing performed for each frame of the moving image scene.

At S105, the camera parameter editing unit 123 acquires the operation for each operation axis of the controller during the playback of the virtual viewpoint image. At S106, the camera parameter editing unit 123 takes the first operation axis of the camera parameters as the processing target. Specifically, for example, in a case where the processing is performed in the order of the X-axis, the Y-axis, the Z-axis, the Pan axis, the Tilt axis, the Roll axis, and the Zoom axis, the camera parameter editing unit 123 first takes the X-axis as the processing target.

At S107, the camera parameter editing unit 123 determines whether or not the operation axis (processing-target operation axis) is set as editing possible (On) by referring to the information (setting value) stored in the setting storage unit 122. That is, the camera parameter editing unit 123 determines whether or not editing is possible. In a case where the operation axis is specified as editing possible (Yes at S107), the information processing apparatus 103 moves the processing to S108 and in a case where the operation axis is not specified as editing possible (No at S107), the information processing apparatus 103 moves the processing to S109. The processing at S107 to S112 is the processing performed for each operation axis.

At S108, the camera parameter editing unit 123 derives (calculates) the value of the camera parameter of the operation axis based on the controller operation acquired at S105. On the other hand, at S109, the camera parameter editing unit 123 reads the value of the parameter of the operation axis of the frame of the already-existing camera parameter specified at S101 from the camera parameter storage unit 124.

At S110, the camera parameter editing unit 123 stores the value calculated at S108 described above or the value acquired at S109 as the value of the operation axis of the frame of the camera parameter being edited in the camera parameter storage unit 124.

At S111, the camera parameter editing unit 123 determines whether or not the operation axis (processing-target operation axis) is the last operation axis in the processing order. In a case where the operation axis is the last operation axis in the processing order (Yes at S111), the information processing apparatus 103 moves the processing to S113 and in a case where the operation axis is not the last operation axis in the processing order (No at S111), the information processing apparatus 103 moves the processing to S112.

At S112, the camera parameter editing unit 123 sets the next operation axis as a processing target and further returns the processing to S107. Specifically, in a case where the processing is performed in the order of the X-axis, the Y-axis, the Z-axis, the Pan axis, the Tilt axis, the Roll axis, and the Zoom axis, on a condition that the current processing target is the X-axis, the Y-axis is set anew as the next processing target (operation axis).

At S113, the camera parameter editing unit 123 determines whether or not the current frame is the last frame (final frame) of the scene. In a case where the current frame is the last frame, the information processing apparatus 103 terminates the processing of the flowcharts shown in FIG. 13A and FIG. 13B and in a case where the current frame is not the last frame, the information processing apparatus 103 moves the processing to S114. At S114, the camera parameter editing unit 123 sets the frame next to the current frame as the editing target and further returns the processing to S104. By the information processing apparatus 103 repeating the processing at S104 to S114 and performing the processing at S110 for all the frames of the scene, the viewpoint information having the camera parameter changed based on the user operation is output to the camera parameter storage unit 124. It may also be possible for the information processing apparatus 103 to output the viewpoint information to another output destination.

Figure 14A:
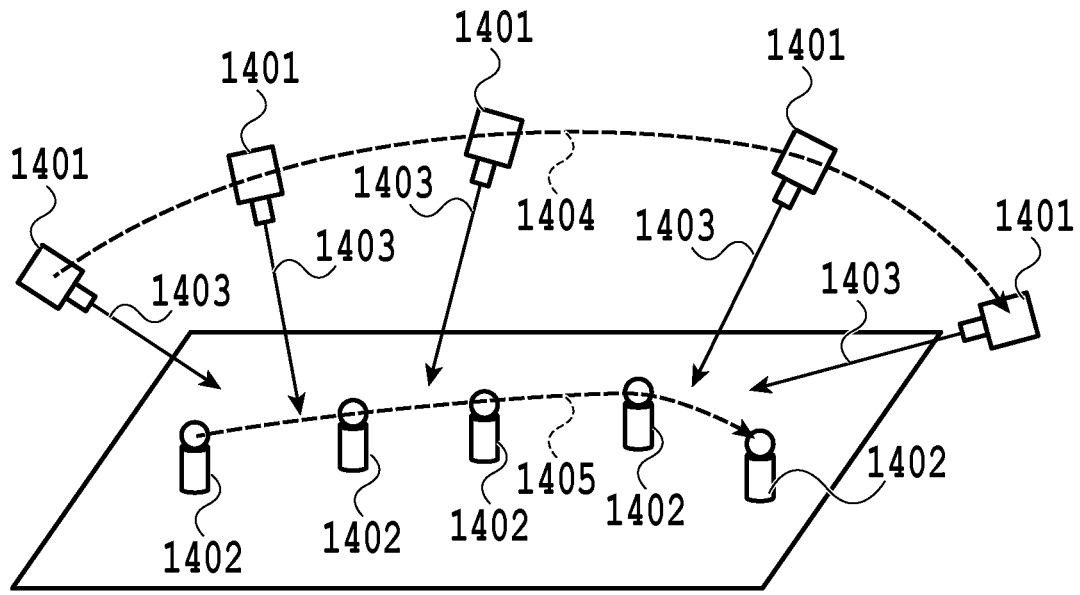
FIG. 14A is a diagram showing results of editing camera parameters.
Figure 14B:
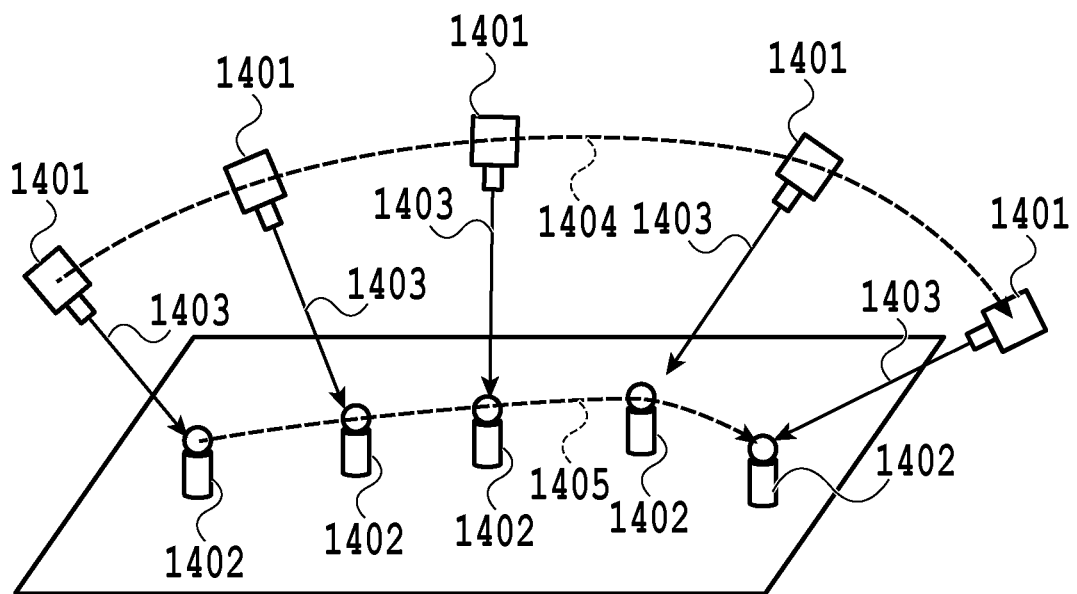
FIG. 14B is a diagram showing results of editing camera parameters.
Figure 15A:
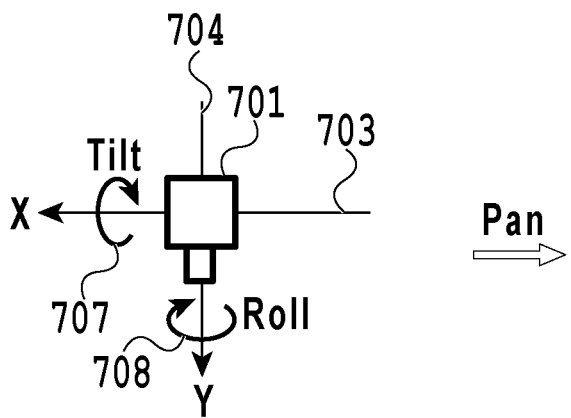
FIG. 15A to FIG. 15F are each a diagram for explaining an operation axis of a virtual camera.
Figure 15B:
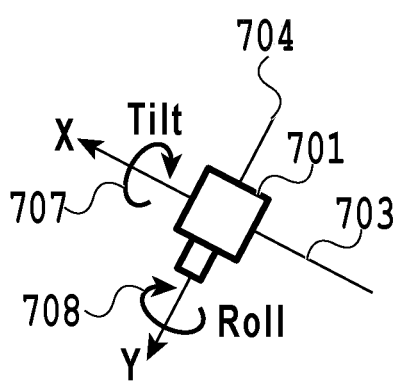
Figure 15C:
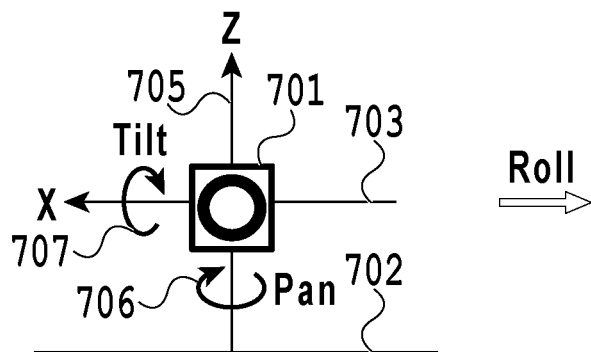
Figure 15D:
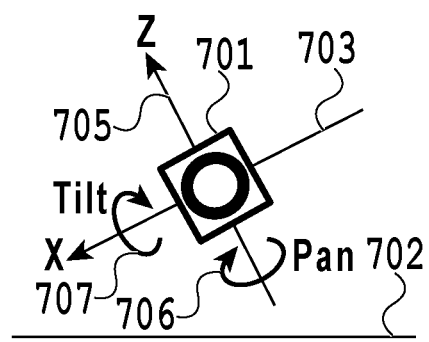
Figure 15E:
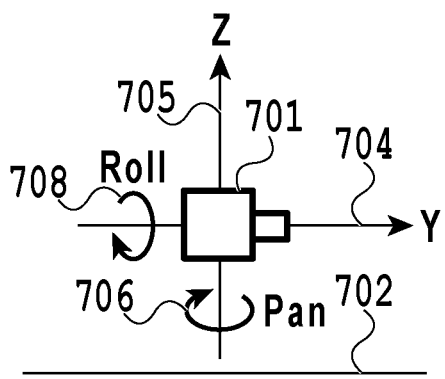
Figure 15F:
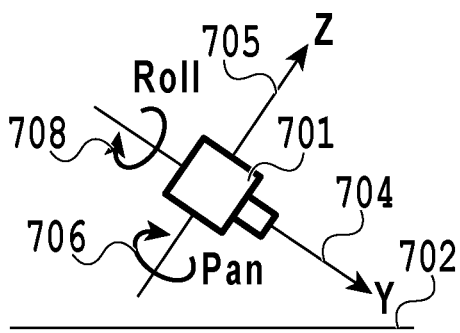

FIG. 14A and FIG. 14B are diagrams showing results of editing camera parameters. In FIG. 14A and FIG. 14B, an object 1402 moves along a locus 1405 and an operator moves a virtual camera 1401 along a locus 1404 so as to follow the object 1402. Here, it is assumed that the operation of the X-axis, the Y-axis, and the Z-axis is assigned to the 3-axis controller 202a, the operation of the Pan axis, the Tilt axis, and the Roll axis is assigned to the 3-axis controller 202b, and the operation of the Zoom axis is assigned to the zoom controller 203.

In the first operation, as shown in FIG. 6A, the X-axis, the Y-axis, the Z-axis, the Pan axis, the Tilt axis, the Roll axis, and the Zoom axis are all brought into the editing possible (On) state. The operator operates the 3-axis controller 202a with one hand to adjust the values of the X-axis, the Y-axis, and the Z-axis and accurately moves the virtual camera so that the virtual camera draws a desired locus while watching mainly the context view 408 of the pilot window. At the same time, the operator operates the 3-axis controller 202b with the other hand to adjust the values of the Pan axis, the Tilt axis, and the Roll axis, but the values of these operation axes are adjust accurately by the second operation, and therefore, it is not necessary to perform the accurate operation (adjustment) in the first operation. Further, the adjustment of the Zoom axis by the zoom controller 203 is performed in the second operation, and therefore, the adjustment of the Zoom axis is not performed in the first operation. The camera parameters output by the first operation are displayed as the replay clips 605 in the replay window in FIG. 7.

In the first operation, as shown in FIG. 14A, the orientation of the virtual camera 1401 somewhat shifts from the desired orientation (orientation toward the object), and therefore, a desired composition is not obtained sufficiently. Consequently, in the second operation, editing of the replay clip 605 is started by pressing down the replay clip editing button 606 of the replay window. Further, in the second operation, as shown in FIG. 6B, the X-axis, the Y-axis, and the Z-axis are brought into the editing not possible (Off) state.

In the second operation, the operator operates the 3-axis controller 202b with one hand and accurately adjusts the values of the Pan axis, the Tilt axis, and the Roll axis while watching mainly the camera view 301 of the camera view window. At the same time, the operator operates the zoom controller 203 with the other hand and accurately adjusts the value of the Zoom axis. By adjusting the values as described above, as shown in FIG. 14B, the position and orientation of the virtual camera enter a desired state. Because of this, it is possible to obtain a desired composition. As a supplement, in a case where there is an operation axis tat needs further fine adjustment among the above-described operation axes, it may also be possible to perform editing again similarly by bringing only the operation axis into the editing possible state (On state). Further, depending on the editing-target operation axis, it is also possible to operate the operation axis by checking one of the pilot window (position and orientation of the virtual camera) and the camera view window. Furthermore, in a case where the camera parameter at a certain time is changed by the user operation, it may also be possible to change a plurality of camera parameters corresponding to each of a plurality of points in time after the point in time of the user operation. For example, in a case where the user operation to shift the position of the virtual camera in a certain frame by one meter in the x-axis direction is performed, it may also be possible for the information processing apparatus 103 to shift the position of the virtual camera in each of the subsequent frames by one meter in the x-axis direction.

As explained above, by reducing the number of operation axes to be controlled at the same time and performing the operation by dividing the operation into a plurality of times for each operation axis, it is made possible to lighten the burden of the operation and reduce the number of operators. Further, by performing the operation as described above, it is possible to adjust the camera parameter accurately and easily for each operation axis. In particular, as described above, by separately performing the operation while watching the context view and the operation while watching the camera view, it is possible for an operator to focus attention on a specific view, and therefore it is possible to perform an accurate operation easily. Further, in a case where it is desired to perform fine adjustment of the camera parameter, it is not necessary to perform the operation again for all the operation axes from the beginning, and it is possible to adjust (change) only the operation axis for which an operator desires to perform fine adjustment, and therefore, it is possible lighten the burden at the time of adjustment.

Second Embodiment

Next, a second embodiment is explained with reference to FIG. 15A to FIG. 15F. FIG. 15A to FIG. 15F are diagrams for explaining the operation axes of the virtual camera. Of the operation axes, the X-axis 703, the Y-axis 704, and the Z-axis 705 correspond to the move operation direction in the side surface direction, in the front surface direction (optical axis direction), and in the top surface direction, respectively, of the virtual camera 701, and the X-axis 703, the Y-axis 704, and the Z-axis 705 are perpendicular to one another. Further, of the operation axes, the Pan axis 706, the Tilt axis 707, and the Roll axis 708 correspond to the rotation operation direction with the Z-axis 705, the X-axis 703, and the Y-axis 704, respectively, as a rotation axis.

In the first embodiment described above, in a case where the operation to move the virtual camera forward by the 3-axis controller 202*a* (that is, movement in the Y-axis direction) is performed, the virtual camera moves in parallel to the ground surface 702 at all times independently of the orientation of the lens of the virtual camera in the vertical direction (that is, independent of Tilt). On the other hand, in the present embodiment (second embodiment), in a case where the operation to move the virtual camera forward by the 3-axis controller 202*a* (that is, movement in the Y-axis direction) is performed similarly, the virtual camera moves in the optical axis direction of the virtual camera. Because of this, in a case where the virtual camera faces downward with respect to the horizontal direction (that is, the Tilt value is negative), the virtual camera moves closer to the ground surface (that is, the Z values becomes smaller). Further, on the contrary, in a case where the virtual camera faces upward with respect to the horizontal direction (that is, the Tilt value is positive), the virtual camera moves away from the ground surface (that is, the Z value becomes larger).

Third Embodiment

Figure 16:
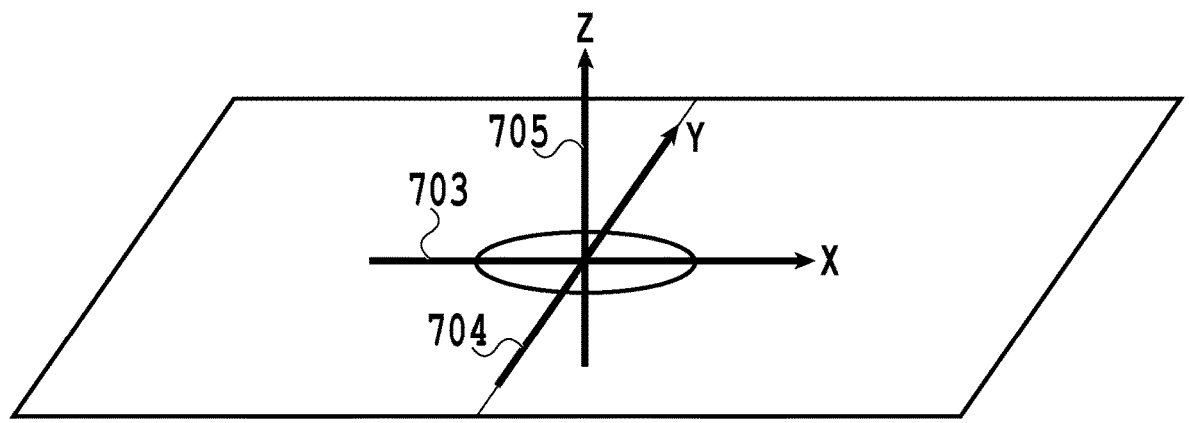
FIG. 16 is a diagram for explaining an operation axis of a virtual camera.

Next, a third embodiment is explained with reference to FIG. 16. FIG. 16 is a diagram for explaining the operation axes of the virtual camera. Of the operation axes, the X-axis 703, the Y-axis 704, and the Z-axis 705 each correspond to a fixed direction at all times without depending on the position and orientation of the virtual camera. Specifically, in a case of the facility, such as a soccer ground, the X-axis 703, the Y-axis 704, and the Z-axis 705 correspond to the move operation direction in the long side direction of the ground, in the short side direction of the ground, and in the direction perpendicular to the ground surface respectively (that is, each operation axis corresponds to the shape of the facility).

The X-axis 703, the Y-axis 704, and the Z-axis 705 are perpendicular to one another. Further, in this case, it is possible to cause the Pan axis 706, the Tilt axis 707, and the Roll axis 708 of the operation axes to correspond to the rotation operation direction with the Z-axis, the X-axis, and the Y-axis, respectively, as a rotation axis as in the case with the first embodiment and the second embodiment described above. However, the example is not limited to this and it may also be possible to set the Pan axis 706, the Tilt axis 707, and the Roll axis 708 so that the X-axis 703 does not coincide with the Pan axis 706, the Y-axis 704 does not coincide with the Tilt axis 707, and the Z-axis 705 does not coincide with the Roll axis 708. For example, even in a case where the X-axis 703 is the coordinate axis with the long side direction of the soccer ground as a reference and the Y-axis 704 is the coordinate axis with the short side direction of the soccer ground as a reference, the rotation axes of the roll and tilt may be set with the orientation of the optical axis of the virtual camera as a reference.

Fourth Embodiment

Next, a fourth embodiment is explained. In the embodiments described above, the example is explained in which replay video images viewed from a variety of viewpoints are provided by editing camera parameters for an already-captured image, but here, an example is explained in which live video images are provided by generating camera parameters real time while performing image capturing.

For example, there is a case where the scenario is determined in advance, such as a music video image and a theater video image. In such a case, the rehearsal is captured and the camera parameters for the rehearsal are created in advance. Specifically, based on the user operation during playback of a virtual viewpoint image based on the image data obtained by image capturing of the rehearsal, the camera parameters for the rehearsal are determined. Then, in a actual performance, camera parameters for the actual performance are created (generated) by editing the camera parameters for the rehearsal in synchronization with the progress of the scenario. That is, the camera parameters for the actual performance are generated by changing the camera parameters for the rehearsal based on the user operation during playback of a virtual viewpoint image based on the image data obtained by image capturing of the actual performance, which is different from the image data obtained by image capturing of the rehearsal. There is a minute difference in the behavior of a performer between the rehearsal and the actual performance, and therefore, the camera parameters for the actual performance are created while adjusting the orientation of the virtual camera (for example, adjusting only the pan, the tilt, and the roll) so as to attain a desired composition in accordance with the difference. Further, broadcast and distribution are performed as a live video image (live image).

Fifth Embodiment

Next, a fifth embodiment is explained. As described, as one of the operation axes, there is a time axis by the replay controller 204 (in more detail, a time axis that controls the playback speed). In a case where camera parameters including the virtual camera operation, such as slow playback and pause, are edited, it may also be possible to enable the replay controller 204 to switch between possible and not possible of adjustment (editing) of the playback speed.

In a case where editing is made possible, irrespective of the playback speed of the already-existing camera parameter, while adjusting the playback speed anew by operating the replay controller 204, an arbitrary operation axis is adjusted by further controlling the 3-axis controller 202 and the zoom controller 203. Further, in a case where editing is made not possible, in accordance with a change in the playback speed of the already-existing camera parameter, an arbitrary operation axis is further adjusted.

As explained above in the first to fifth embodiments, in generation of a virtual viewpoint image, by improving the degree of freedom of the virtual viewpoint operation, it is possible to lighten the burden of the operation. Further, the definition of the operation axes is not necessarily limited to the definition described in the first to fifth embodiments described above.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the embodiments described above, the operability of a virtual viewpoint improves.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-159231 filed Aug. 28, 2018, which is hereby incorporated by reference wherein in its entirety.

What is claimed is:

1. An information processing apparatus comprising:
one or more hardware processors; and
one or more memories storing one or more programs configured to be executed by the one or more hardware processors, the one or more programs including instructions for:
obtaining a plurality of virtual viewpoint parameters including positions of a virtual viewpoint and directions of view from a virtual viewpoint, and representing a movement path of the virtual viewpoint, the virtual viewpoint parameters being used for generating a virtual viewpoint image based on image data obtained by performing image capturing by a plurality of image capturing apparatuses;
receiving a second input for changing one or more virtual viewpoint parameters of the plurality of obtained virtual viewpoint parameters, from an operation device that enables input for changing two or more virtual viewpoint parameters of the plurality of obtained virtual viewpoint parameters in a single operation performed via a joystick;
determining whether changing the one or more virtual viewpoint parameters specified based on the second input received via the joystick is permitted based on a first input; and
in a case where (i) the input for changing two or more virtual viewpoint parameters in the single operation performed via the joystick is received, (ii) it is determined that changing one or more virtual viewpoint parameters of the two or more virtual viewpoint parameters is permitted and (iii) it is determined that changing other virtual viewpoint parameters of the two or more virtual viewpoint parameters is not permitted, changing the one or more virtual viewpoint parameters of the two or more virtual viewpoint parameters and not changing other virtual viewpoint parameters of the two or more virtual viewpoint parameters.

2. The information processing apparatus according to claim 1,
wherein the one or more programs further include instructions for setting a sensitivity relating to a change of a virtual viewpoint parameter, and
wherein the one or more virtual viewpoint parameters determined to be permitted to be changed is changed by a change amount in accordance with the set sensitivity and the second input from the operation device.

3. The information processing apparatus according to claim 1, wherein the one or more virtual viewpoint parameters determined to be permitted to be changed are changed while the virtual viewpoint image, which is generated based on the plurality of obtained virtual viewpoint parameters, is displayed.

4. The information processing apparatus according to claim 1, wherein the plurality of virtual viewpoint parameters corresponding to each of a plurality of points in time is obtained.

5. The information processing apparatus according to claim 1,
wherein the one or more programs further include instructions for causing a display to display the virtual viewpoint image based on the plurality of obtained virtual viewpoint parameters.

6. The information processing apparatus according to claim 1,
wherein the plurality of virtual viewpoint parameters includes three kinds of parameters for representing a three-dimensional position of a virtual viewpoint, and each parameter corresponding to the three kinds is determined whether to be permitted to be changed.

7. The information processing apparatus according to claim 1,
wherein the plurality of virtual viewpoint parameters includes parameters representing a pan, a tilt, and a roll of a virtual viewpoint, and each of a parameter representing the pan, a parameter representing the tilt, and a parameter representing the roll is determined whether to be permitted to be changed.

8. The information processing apparatus according to claim 1,
wherein the plurality of virtual viewpoint parameters includes at least one of a parameter relating to an angle of view of a virtual viewpoint and a parameter relating to a playback speed of the virtual viewpoint image.

9. The information processing apparatus according to claim 1,
wherein the one or more programs further include instructions for generating the virtual viewpoint image corresponding to the one or more virtual viewpoint parameters including changed virtual viewpoint parameters and not changed virtual viewpoint parameters.

10. The information processing apparatus according to claim 1, wherein the input from the operation device is based on a user operation performed during playback of the virtual viewpoint image corresponding to the plurality of obtained virtual viewpoint parameters.

11. The information processing apparatus according to claim 1, wherein the plurality of virtual viewpoint parameters is obtained based on an input from the operation device.

12. The information processing apparatus according to claim 1, wherein the one or more programs further include instructions for:
receiving settings for the plurality of virtual viewpoint parameters from a user operation performed during a display of an image that is different from the virtual viewpoint image generated based on the image data; and
determining whether changing one or more virtual viewpoint parameters among the plurality of obtained virtual viewpoint parameters is permitted based at least on the received settings.

13. The information processing apparatus according to claim 1, wherein the first input is used to set whether changing one or more virtual viewpoint parameters among the plurality of obtained virtual viewpoint parameters is permitted.

14. A non-transitory computer readable storage medium storing a program for causing a computer to perform a control method for an information processing apparatus, the control method comprising:
obtaining a plurality of virtual viewpoint parameters including positions of a virtual viewpoint and directions of view from a virtual viewpoint, and representing a movement path of the virtual viewpoint, the virtual viewpoint parameters being used for generating a virtual viewpoint image based on image data obtained by performing image capturing by a plurality of image capturing apparatuses;
receiving a second input for changing one or more virtual viewpoint parameters of the plurality of obtained virtual viewpoint parameters, from an operation device that enables input for changing two or more virtual viewpoint parameters of the plurality of obtained virtual viewpoint parameters in a single operation performed via a joystick;
determining whether changing the one or more virtual viewpoint parameters specified based on the second input received via the joystick is permitted based on a first input; and
in a case where (i) the input for changing two or more virtual viewpoint parameters in the single operation performed via the joystick is received, (ii) it is determined that changing one or more virtual viewpoint parameters of the two or more virtual viewpoint parameters is permitted and (iii) it is determined that changing other virtual viewpoint parameters of the two or more virtual viewpoint parameters is not permitted, changing the one or more virtual viewpoint parameters of the two or more virtual viewpoint parameters and not changing other virtual viewpoint parameters of the two or more virtual viewpoint parameters.

15. An information processing method comprising:
obtaining a plurality of virtual viewpoint parameters including positions of a virtual viewpoint and directions of view from a virtual viewpoint, and representing a movement path of the virtual viewpoint, the virtual viewpoint parameters being used for generating a virtual viewpoint image based on image data obtained by performing image capturing by a plurality of image capturing apparatuses;
receiving a second input for changing one or more virtual viewpoint parameters of the plurality of obtained virtual viewpoint parameters, from an operation device that enables input for changing two or more virtual viewpoint parameters of the plurality of obtained virtual viewpoint parameters in a single operation performed via a joystick;
determining whether changing the one or more virtual viewpoint parameters specified based on the second input received via the joystick is permitted based on a first input; and
in a case where (i) the input for changing two or more virtual viewpoint parameters in the single operation performed via the joystick is received, (ii) it is determined that changing one or more virtual viewpoint parameters of the two or more virtual viewpoint parameters is permitted and (iii) it is determined that changing other virtual viewpoint parameters of the two or more virtual viewpoint parameters is not permitted, changing the one or more virtual viewpoint parameters of the two or more virtual viewpoint parameters and not changing other virtual viewpoint parameters of the two or more virtual viewpoint parameters.

16. The information processing method according to claim 15, wherein the plurality of virtual viewpoint parameters corresponding to each of a plurality of points in time is obtained.

* * * * *